US011783275B2

(12) United States Patent
Arora et al.

(10) Patent No.: US 11,783,275 B2
(45) Date of Patent: *Oct. 10, 2023

(54) SYSTEMS, METHODS, AND COMPUTER PROGRAM PRODUCTS FOR PROVIDING REAL-TIME VALIDATION OF CONTAINER LOADING AND POSITIONING DATA

(71) Applicant: United Parcel Service of America, Inc., Atlanta, GA (US)

(72) Inventors: Shikha Arora, Louisville, KY (US); Todd Guilford, Louisville, KY (US); Wai Lam, Louisville, KY (US); Cindy Peck, Shepherdsville, KY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/176,760

(22) Filed: Feb. 16, 2021

(65) Prior Publication Data
US 2021/0312382 A1    Oct. 7, 2021

Related U.S. Application Data

(63) Continuation of application No. 16/272,574, filed on Feb. 11, 2019, now Pat. No. 10,956,853, which is a (Continued)

(51) Int. Cl.
G06Q 10/08         (2023.01)
B64D 9/00          (2006.01)
(Continued)

(52) U.S. Cl.
CPC .......... G06Q 10/0832 (2013.01); B64D 9/00 (2013.01); G01G 19/40 (2013.01)

(58) Field of Classification Search
CPC ....... G06Q 10/0832; B64D 9/00; G01G 19/40
See application file for complete search history.

(56) References Cited

U.S. PATENT DOCUMENTS 4,935,885 A * 6/1990 McHale ................ G01M 1/125
                                                       177/199
5,804,802 A   9/1998 Card et al.
(Continued)

OTHER PUBLICATIONS

United Parcel Service of America,"Load to Position: Project Summary Presentation", Dec. 5, 2013, 10 pages.

Primary Examiner — Thomas Randazzo
(74) Attorney, Agent, or Firm — SHOOK, HARDY & BACON L.L.P.

(57) ABSTRACT

Various embodiments provide systems, methods, and computer program products for providing dynamic real-time verification and validation of data associated with the receiving, loading, and positioning of a plurality of containers upon a transport vehicle. One or more computer processors are configured to: receive actual load data associated with at least one container; retrieve at least a portion of expected load data associated with the container for which actual load data has been received; verify the actual weight of the one of the plurality of packages and in response to a successful verification identifying no load weight discrepancies, validate the actual load position of the one of the plurality of packages. In response to a successful validation, at least one communication configured to facilitate at least one of further loading of the plurality of packages may be generated. If validation is unsuccessful, further loading may be prevented.

20 Claims, 12 Drawing Sheets

Related U.S. Application Data continuation of application No. 14/199,438, filed on Mar. 6, 2014, now Pat. No. 10,210,473.

(51) Int. Cl.
*G01G 19/40* (2006.01)
*G06Q 10/0832* (2023.01)

(56) References Cited

U.S. PATENT DOCUMENTS

| | | | |
|---|---|---|---|
| 6,308,131 | B1 | 10/2001 | Fox |
| 6,332,098 | B2 | 12/2001 | Ross et al. |
| 7,003,374 | B2* | 2/2006 | Olin ............... B64D 9/003 410/77 |
| 7,198,227 | B2 | 4/2007 | Dlin et al. |
| 8,185,234 | B2* | 5/2012 | Tietjen ............ B64D 9/00 702/175 |
| 8,515,656 | B2* | 8/2013 | Reed ............... G01M 1/125 701/3 |
| 10,210,473 | B2* | 2/2019 | Arora ............. G06Q 10/0832 |
| 10,956,853 | B2* | 3/2021 | Arora ............. G01G 19/40 |
| 2001/0041948 | A1 | 11/2001 | Ross et al. |
| 2002/0099497 | A1* | 7/2002 | Godwin ........... G01M 1/125 701/3 |
| 2005/0216294 | A1 | 9/2005 | Labow |
| 2005/0246057 | A1* | 11/2005 | Olin ............... B64D 9/003 244/118.1 |
| 2006/0038077 | A1* | 2/2006 | Olin ............... G06Q 10/08 244/137.1 |
| 2007/0000990 | A1 | 1/2007 | Baldassari et al. |
| 2008/0167760 | A1* | 7/2008 | Scherenberger ... G06Q 10/08 701/3 |
| 2009/0105874 | A1* | 4/2009 | Tietjen ............ B64D 9/00 700/214 |
| 2009/0192846 | A1* | 7/2009 | Stefani ........... G06Q 10/0639 705/7.41 |
| 2009/0254445 | A1 | 10/2009 | Bennett et al. |
| 2011/0054979 | A1 | 3/2011 | Cova et al. |
| 2011/0212690 | A1 | 9/2011 | White et al. |
| 2012/0179621 | A1 | 7/2012 | Moir et al. |
| 2014/0180953 | A1 | 6/2014 | Westcott et al. |
| 2015/0254604 | A1 | 9/2015 | Arora et al. |
| 2018/0094966 | A1* | 4/2018 | Buether .......... B62D 53/068 |

* cited by examiner

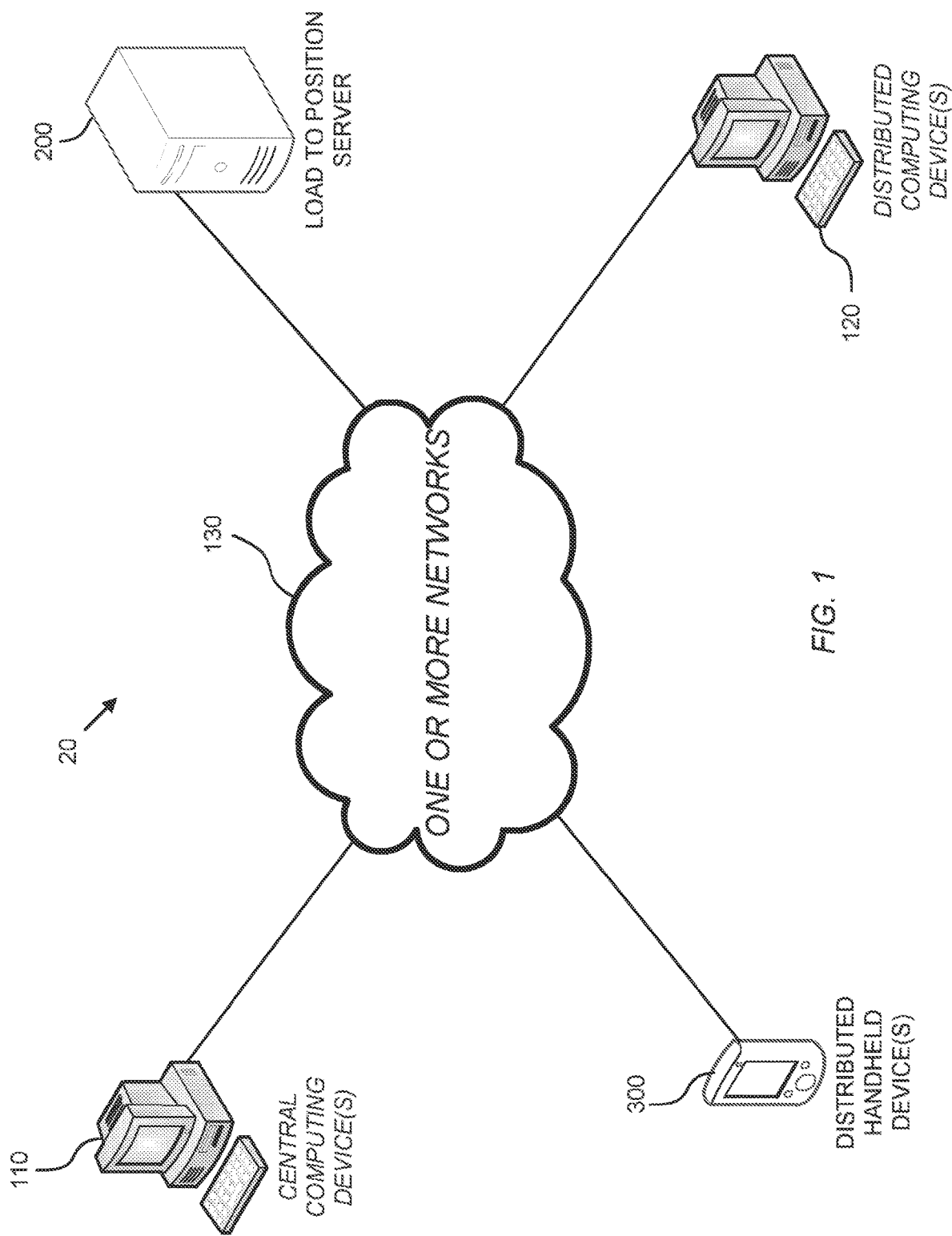

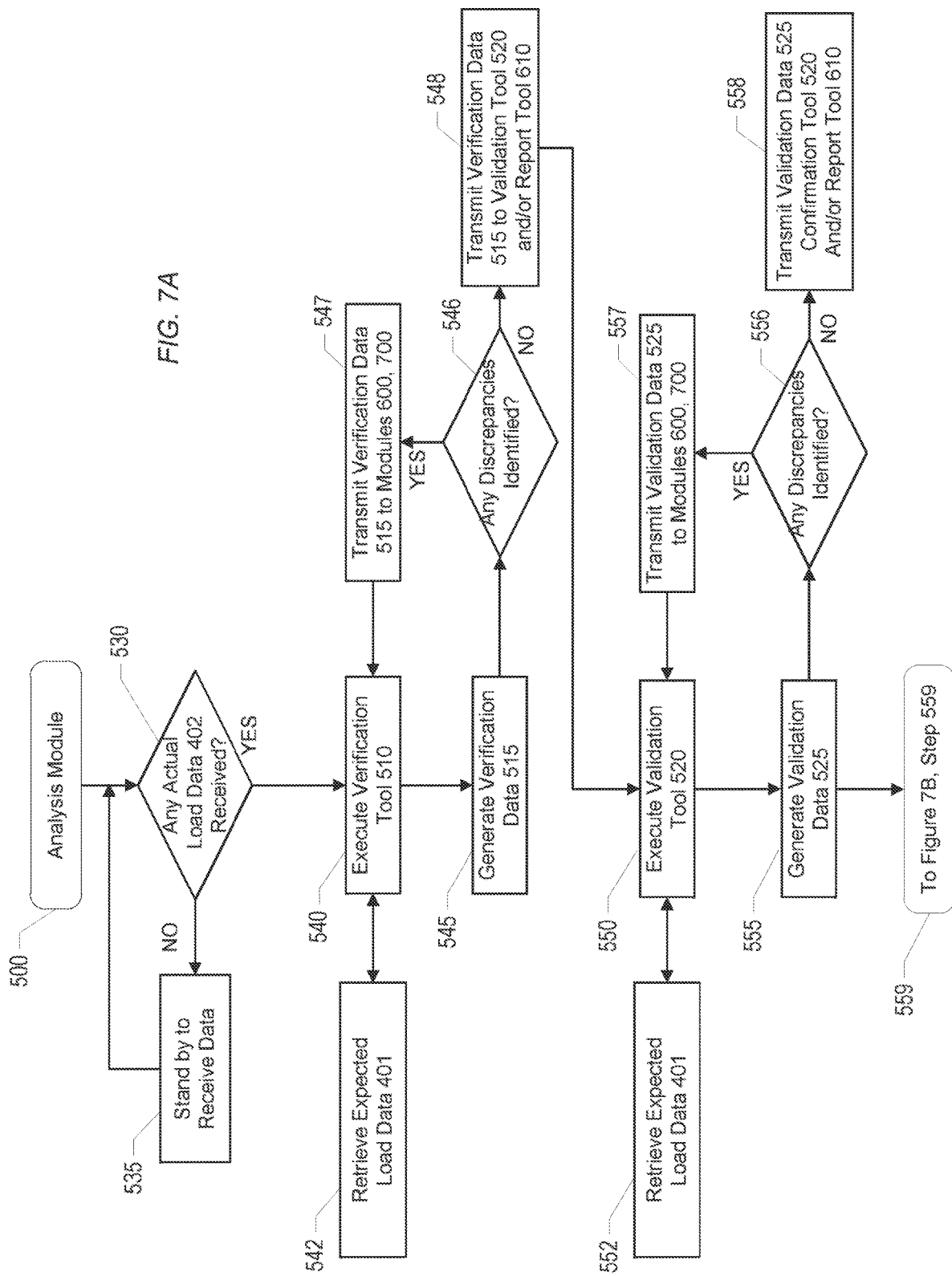

SYSTEMS, METHODS, AND COMPUTER PROGRAM PRODUCTS FOR PROVIDING REAL-TIME VALIDATION OF CONTAINER LOADING AND POSITIONING DATA

CROSS-REFERENCE TO RELATED APPLICATIONS

The present application is a continuation of U.S. application Ser. No. 16/272,574, filed Feb. 11, 2019 and hereby claims priority to U.S. application Ser. No. 14/199,438, filed Mar. 6, 2014, and titled "Systems, Methods, and Computer Program Products for Providing Real-Time Validation of Container Loading and Positioning Data." The contents of the foregoing are herein incorporated by reference in their entirety.

BACKGROUND

Field of Invention

Various embodiments of the disclosed invention generally relate to systems, methods, and computer program products for providing real-time validation of container loading and positioning data. For example, during the loading of an aircraft with a plurality of containers prior to takeoff, the capture and validation of weight and balance and position information is critical so as to ensure that the load is safe and satisfies any and all regulatory requirements. Various embodiments provide such in an electronic, easily accessible fashion.

Description of Related Art

In the United States and elsewhere, verification and validation of proper balance of commercial aircraft, upon loading thereof with cargo and containers, is critical so as to ensure that the aircraft is safety and efficiently operated. According to conventional procedures, expected cargo and container data, including identifier numbers, weights, and planned loading positions are received by a ramp supervisor. The ramp supervisor, via a radio and a clipboard, received that data and commences to direct the loading of the actual (e.g., present and received cargo and container data). As oftentimes the actual data, whether weight or otherwise, varies relative to the expected data, loader personnel, during the loading of the aircraft, use a second clipboard to manually record the actual observed data. Prior to takeoff, the ramp supervisor performs a double check (sometimes referred to as a "three-minute check") to compare the actual aircraft load data to the received expected data, as may be contained within a draft manifest for the aircraft. Upon agreement of the actual versus expected data, the finalized manifest is conventionally physically handed to the flight crew and the aircraft is deemed ready to departure.

Amongst various challenges, such conventional procedures inherently introduce inaccuracies and inefficiencies, incurring last minute, costly operational mitigation processes when discrepancies are found after a majority (or all) of the aircraft has been physically loaded. Where discrepancies are identified due to delay, post-departure of aircraft, exposure to liability and/or regulatory fines may be introduced as well when reliance is solely upon conventional, manually-focused and based aircraft loading to position procedures and processes. Thus, a need exists for improved systems, methods, and computer program products for providing real-time electronic validation of container loading and positioning data. A need also exists to provide real-time electronically communicated mitigation actions upon identification of discrepancies so as to substantially minimize and/or eliminate occurrences of extensive unloading and/or reloading of aircraft.

BRIEF SUMMARY

According to various embodiments of the present invention, a load to position system for providing dynamic real-time verification and validation of data associated with the receiving, loading, and positioning of a plurality of containers upon a transport vehicle is provided. The system comprises: one or more memory storage areas containing expected load data associated with the plurality of containers for which transit upon the transport vehicle is planned, the expected load data comprising a container identification number, an expected load weight, and an expected load position for each of the plurality of containers; and one or more computer processors. The one or more computer processors are configured to: receive actual load data associated with at least one of the plurality of containers, the actual load data comprising at least the container identification number and one or more of an actual load weight and an actual load position for the one of the plurality of containers; retrieve at least a portion of the expected load data associated with the one of the plurality of containers for which actual load data has been received, the retrieval being based at least in part upon identifying the corresponding container identification numbers in the received actual load data and the retrieved portion of the expected load data; verify the actual weight of the one of the plurality of packages, the verification being based at least in part upon a comparison of the retrieved expected load weight for the one of the plurality of packages against the actual load weight so as to determine whether a load weight discrepancy exists there-between; in response to a successful verification identifying no load weight discrepancies, validate the actual load position of the one of the plurality of packages, the validation being based at least in part upon a comparison of the retrieved expected load position for the one of the plurality of packages against the actual load data so as to determine whether a load position discrepancy exists there-between; in response to a successful validation identifying no load position discrepancies, generate at least one communication configured to facilitate at least one of further loading of the plurality of packages or departure of the transport vehicle; and in response to identifying at least one of the weight discrepancy or the load position discrepancy, generate at least one communication indicative of at least one of an unsuccessful verification or an unsuccessful validation and being configured to prevent at least one of further loading of the plurality of packages or departure of the transport vehicle.

According to various embodiments of the present invention, a computer-implemented method for dynamic real-time verification and validation of data associated with the receiving, loading, and positioning of a plurality of containers upon a transport vehicle is provided. The method comprises the step of receiving and storing within one or more memory storage areas: expected load data associated with the plurality of containers for which transit upon the transport vehicle is planned, the expected load data comprising a container identification number, an expected load weight, and an expected load position for each of the plurality of container; and actual load data associated with at least one of the plurality of containers, the actual load data comprising at least the container identification number and one or more of an actual load weight and an actual load position for the one of the plurality of container. The method further comprises the steps of: retrieving, via at least one computer processor, at least a portion of the expected load data associated with the one of the plurality of containers for which actual load data has been received, the retrieval being based at least in part upon identifying the corresponding container identification numbers in the received actual load data and the retrieved portion of the expected load data; verifying, via the at least one computer processor, the actual weight of the one of the plurality of packages, the verification being based at least in part upon a comparison of the retrieved expected load weight for the one of the plurality of packages against the actual load weight so as to determine whether a load weight discrepancy exists there-between; in response to a successful verification identifying no load weight discrepancies, validating, via the at least one computer processor, the actual load position of the one of the plurality of packages, the validation being based at least in part upon a comparison of the retrieved expected load position for the one of the plurality of packages against the actual load data so as to determine whether a load position discrepancy exists there-between; in response to a successful validation identifying no load position discrepancies, generating, via the at least one computer processor, at least one communication configured to facilitate at least one of further loading of the plurality of packages or departure of the transport vehicle; and in response to identifying at least one of the weight discrepancy or the load position discrepancy, generating, via the at least one computer processor, at least one communication indicative of at least one of an unsuccessful verification or an unsuccessful validation and being configured to prevent at least one of further loading of the plurality of packages or departure of the transport vehicle.

According to various embodiments of the present invention, a non-transitory computer program product comprising at least one computer-readable storage medium having computer-readable program code portions embodied therein is provided. The computer-readable program code portions comprise an executable portion configured for receiving a plurality of data, wherein the data comprises: expected load data associated with the plurality of containers for which transit upon the transport vehicle is planned, the expected load data comprising a container identification number, an expected load weight, and an expected load position for each of the plurality of container; and actual load data associated with at least one of the plurality of containers, the actual load data comprising at least the container identification number and one or more of an actual load weight and an actual load position for the one of the plurality of containers. The computer-readable program code portions further comprise: an executable portion configured for retrieving at least a portion of the expected load data associated with the one of the plurality of containers for which actual load data has been received, the retrieval being based at least in part upon identifying the corresponding container identification numbers in the received actual load data and the retrieved portion of the expected load data; an executable portion configured for verifying the actual weight of the one of the plurality of packages, the verification being based at least in part upon a comparison of the retrieved expected load weight for the one of the plurality of packages against the actual load weight so as to determine whether a load weight discrepancy exists there-between; an executable portion configured for, in response to a successful verification identifying no load weight discrepancies, validating the actual load position of the one of the plurality of packages, the validation being based at least in part upon a comparison of the retrieved expected load position for the one of the plurality of packages against the actual load data so as to determine whether a load position discrepancy exists there-between; an executable portion configured for, in response to a successful validation identifying no load position discrepancies, generating at least one communication configured to facilitate at least one of further loading of the plurality of packages or departure of the transport vehicle; and an executable portion configured for, in response to identifying at least one of the weight discrepancy or the load position discrepancy, generating at least one communication indicative of at least one of an unsuccessful verification or an unsuccessful validation and being configured to prevent at least one of further loading of the plurality of packages or departure of the transport vehicle.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

FIG. 1 is a block diagram of a system 20 according to various embodiments;

Figure 2A:
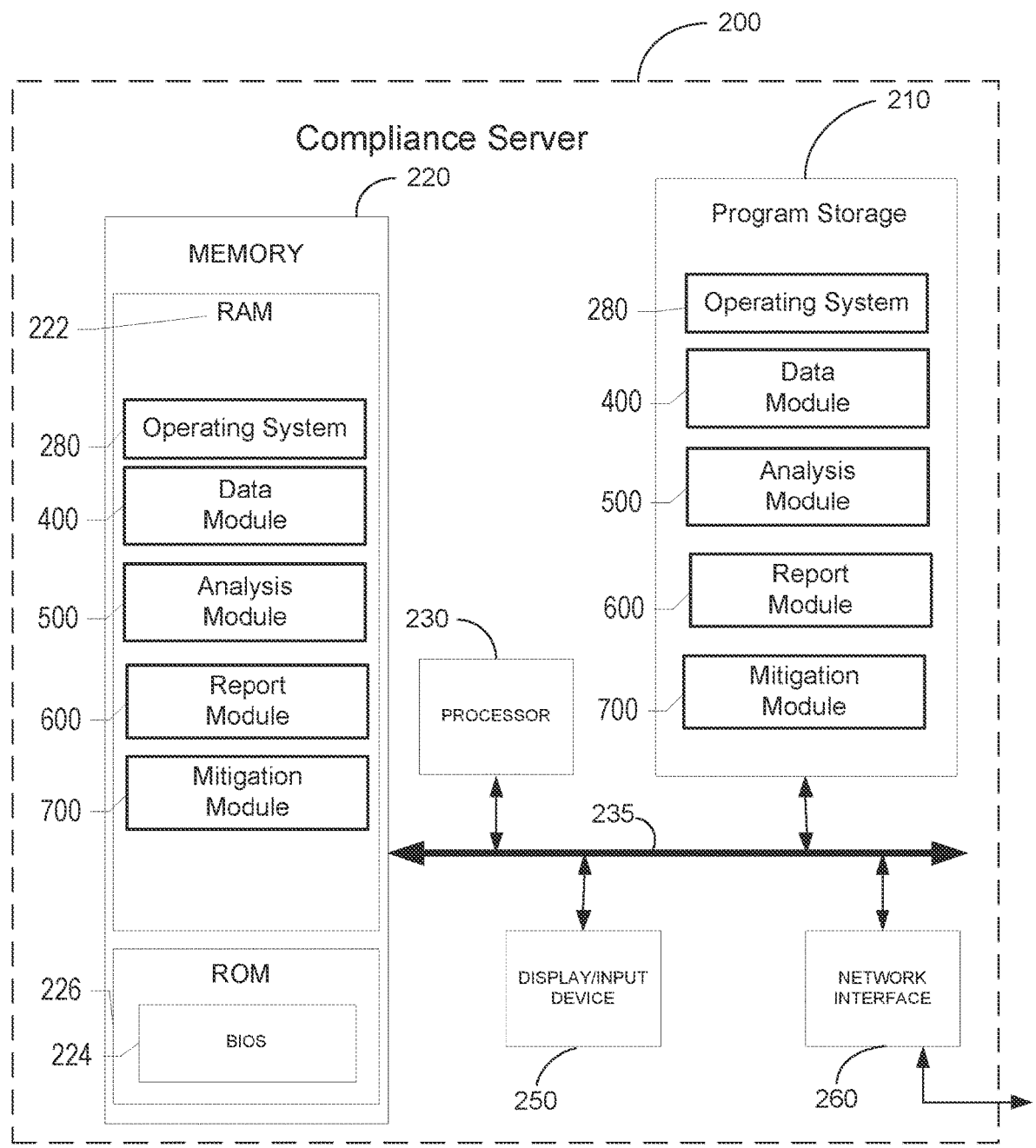
FIG. 2A is schematic block diagram of a server 200 according to various embodiments.
Figure 2B:
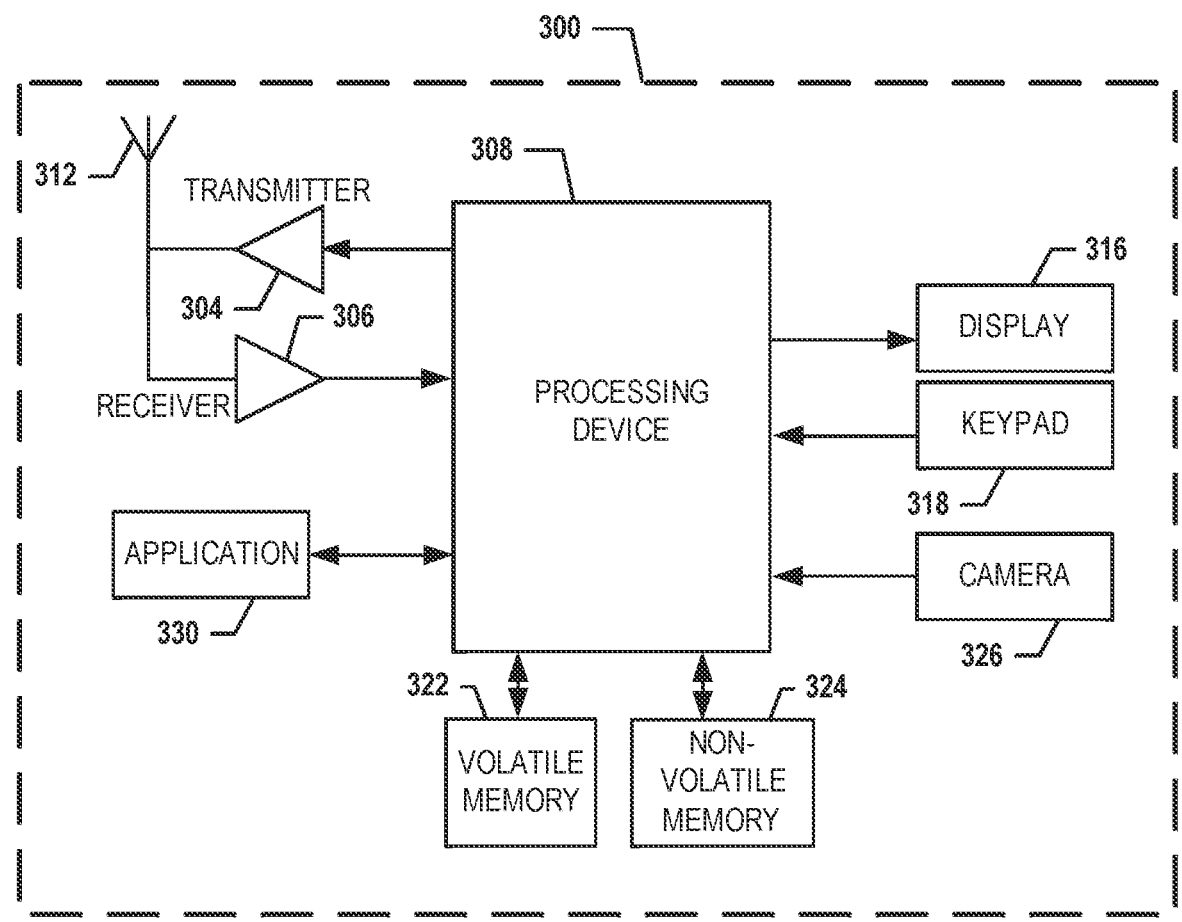
FIG. 2B is schematic block diagram of an exemplary mobile device 300 according to various embodiments.
Figure 3:
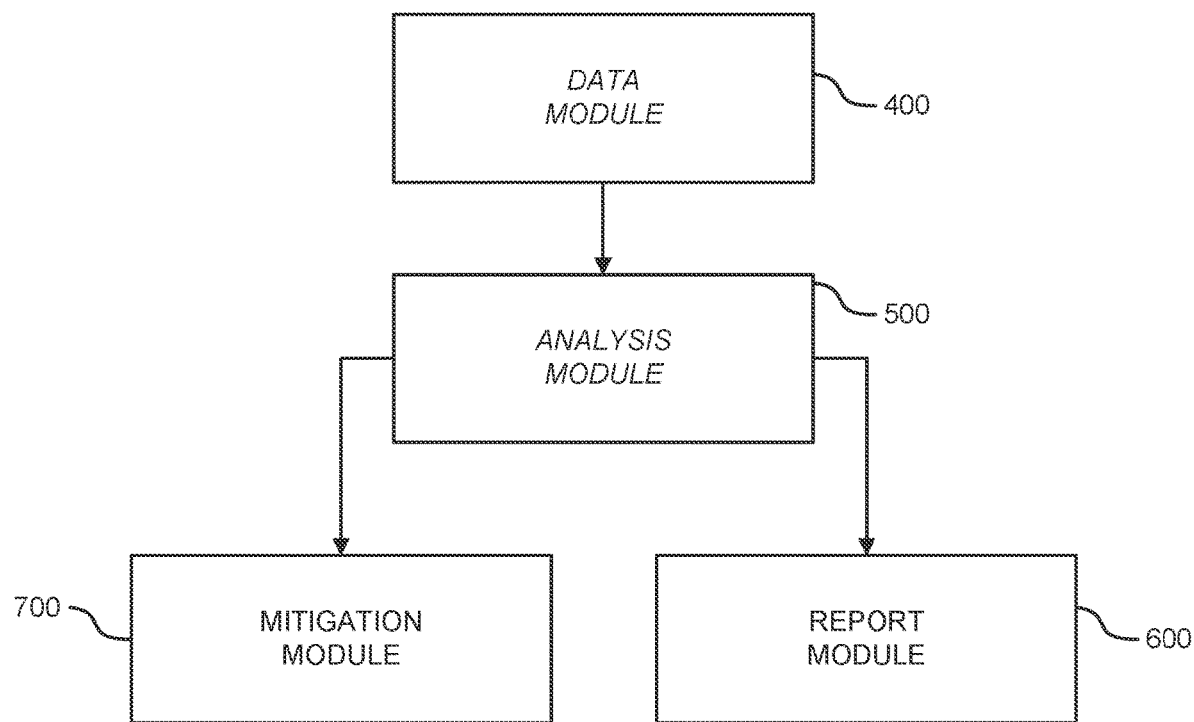
FIG. 3 illustrates an overall process flow for various modules of the server 200 according to various embodiments.
Figure 5:
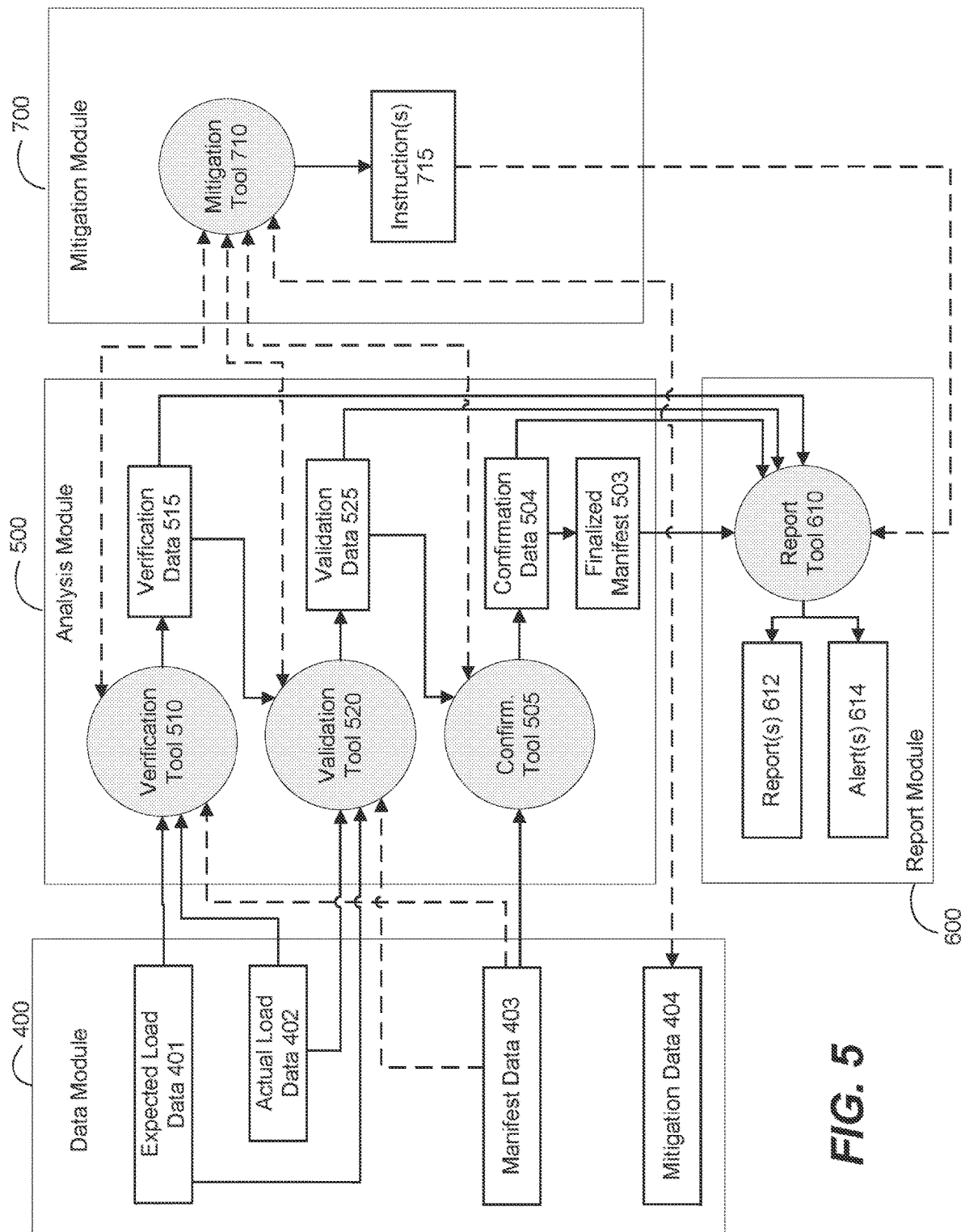
Figure 6:
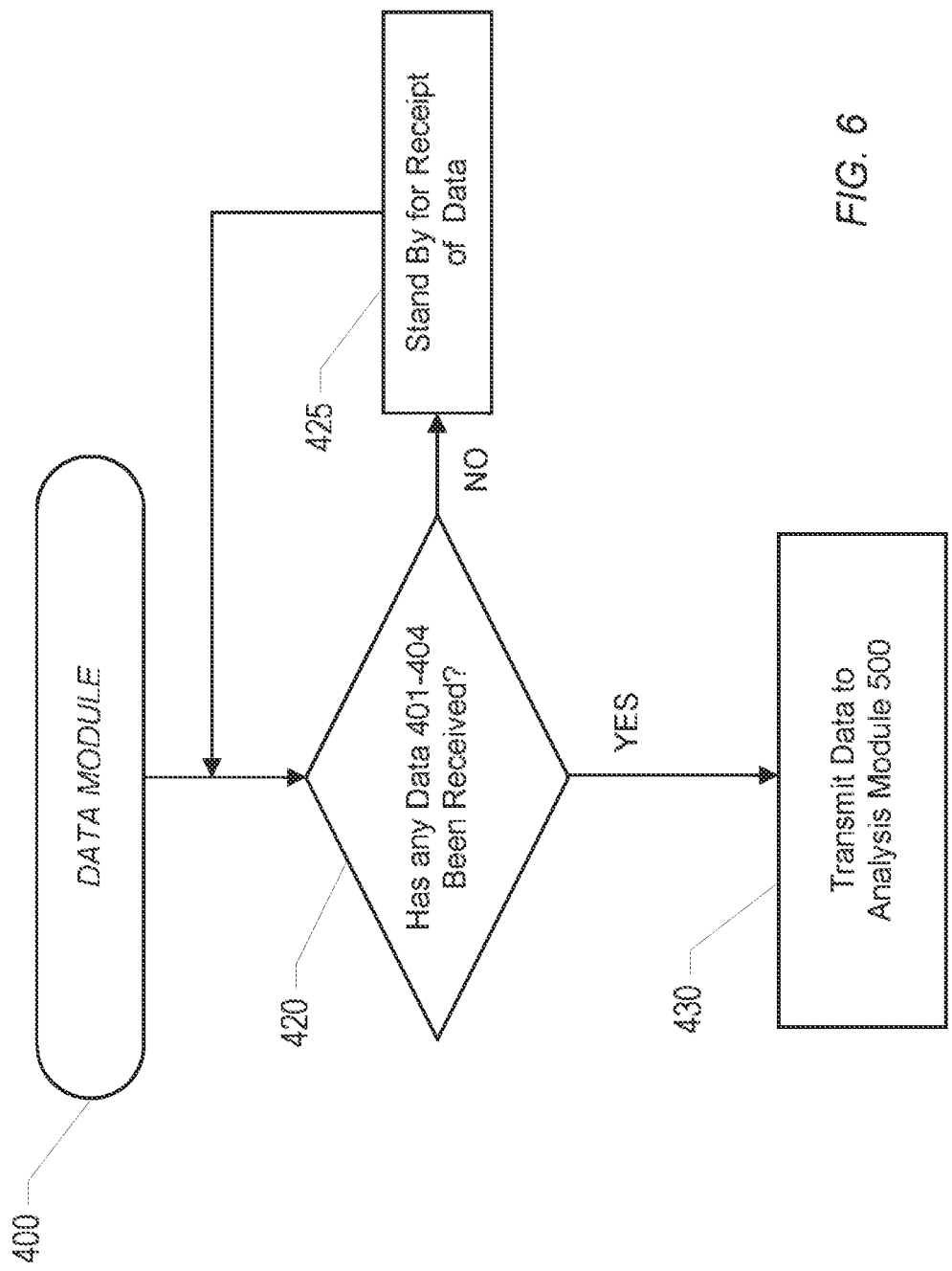
Figure 7B:
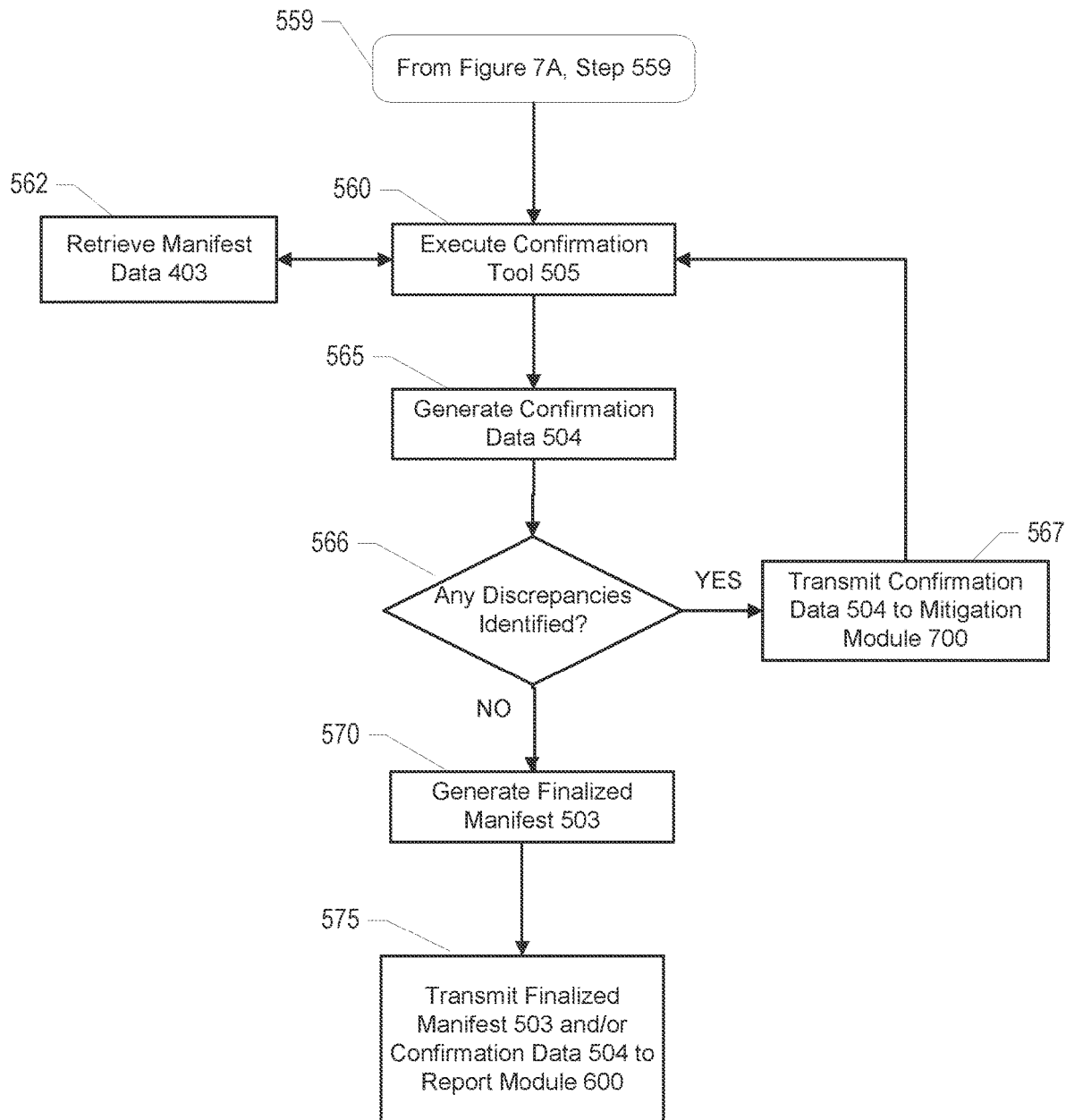
Figure 8:
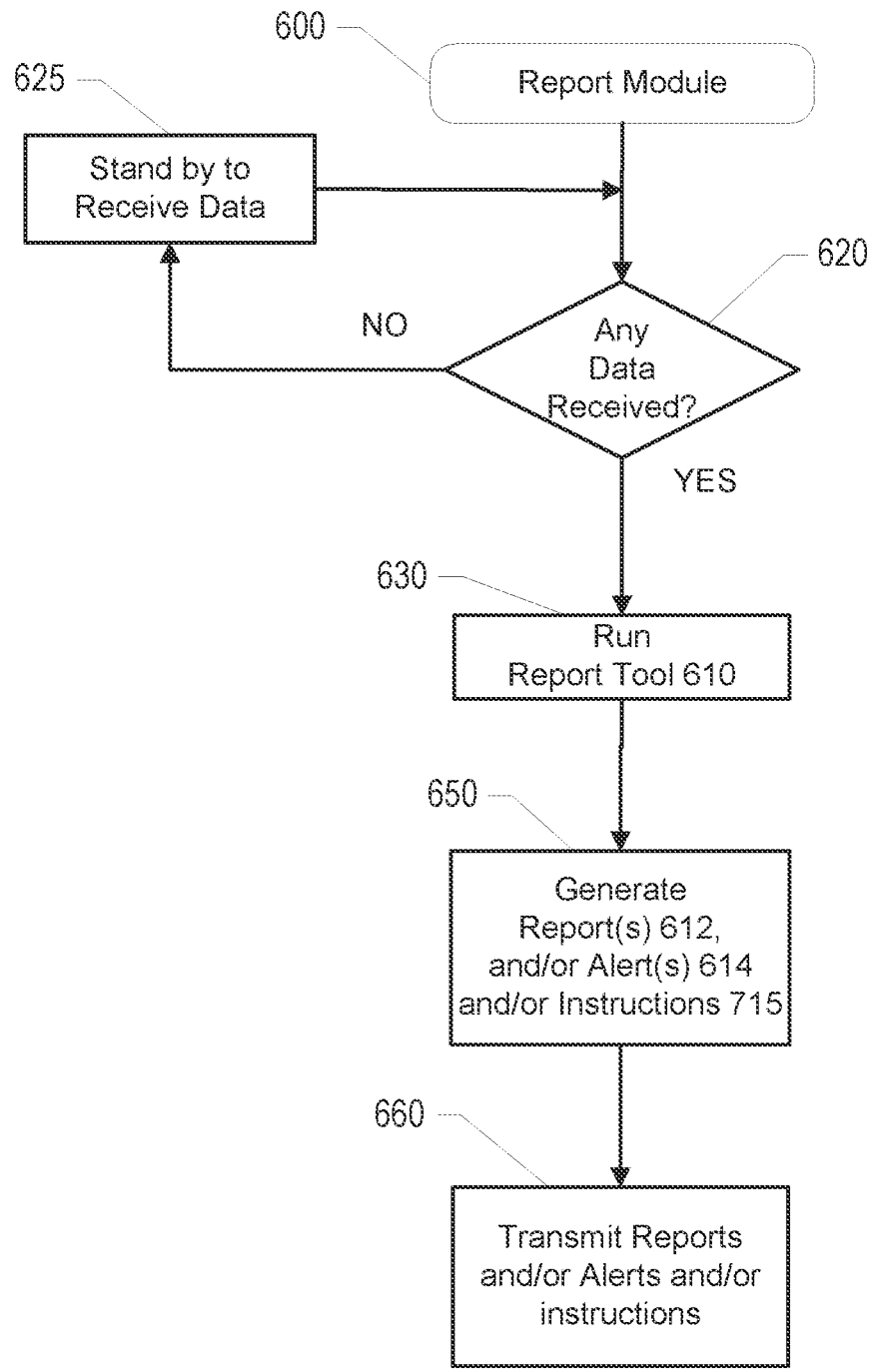
Figure 9:
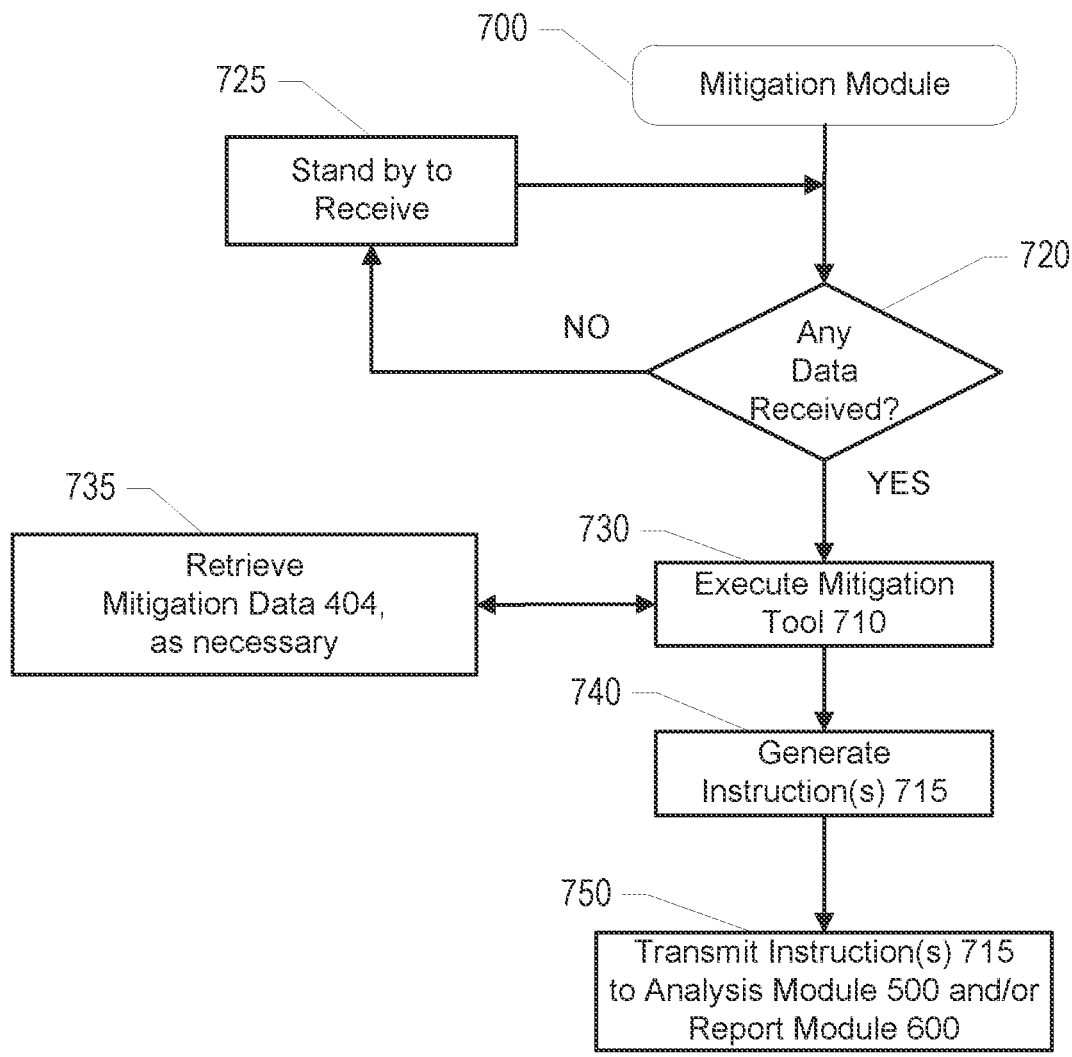
Figure 10:
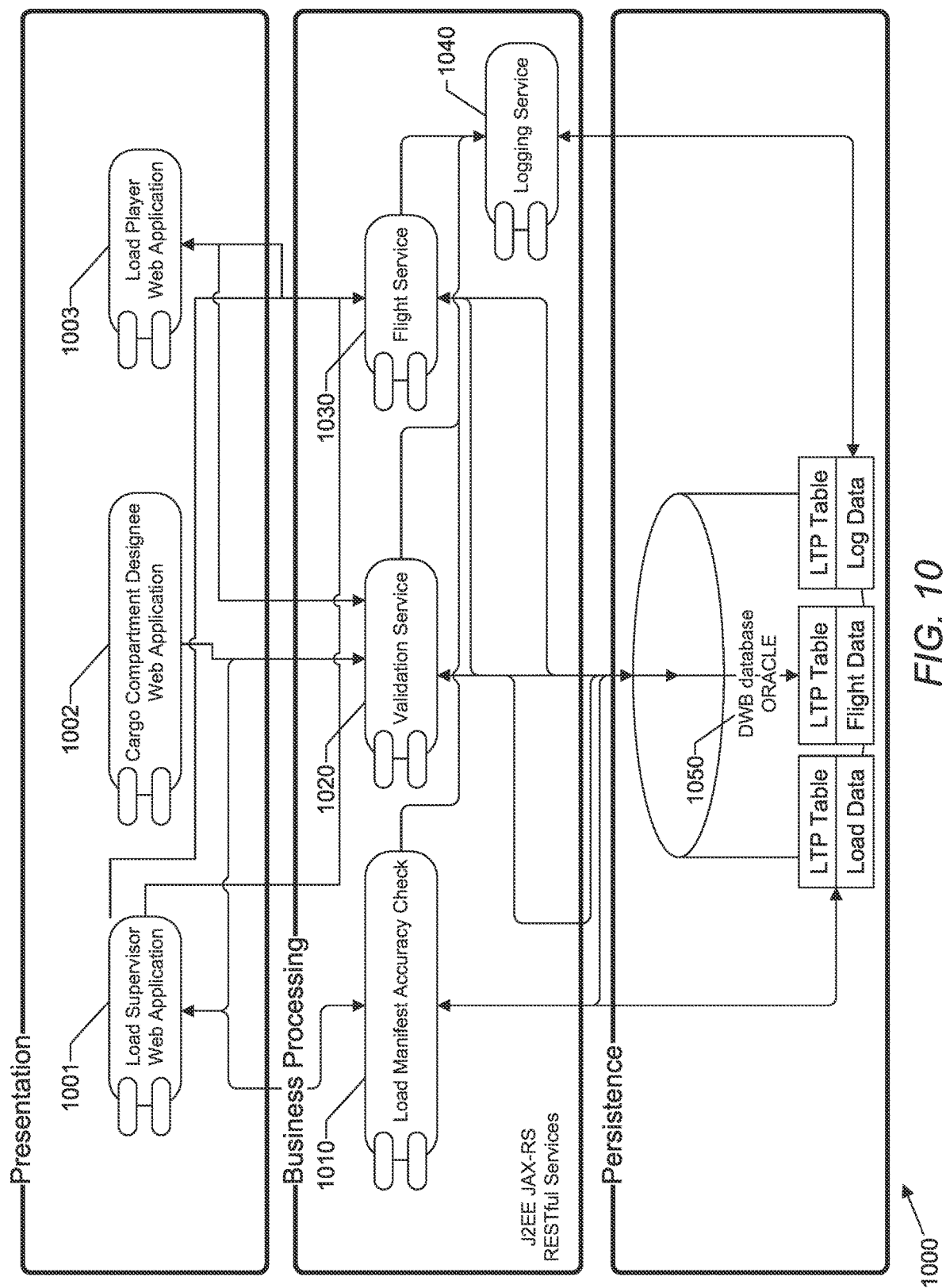

FIG. 5 is a schematic block diagram of a data module 400, an analysis module 500, a report module 600, and a mitigation module 700, all as also illustrated in FIGS. 2 and 3 according to various embodiments;

FIG. 6 illustrates an exemplary process flow according to various embodiments for the data module 400 shown in FIGS. 2 and 5;

FIG. 7A illustrates an exemplary process flow according to various embodiments for the analysis module 500 shown in FIGS. 2 and 5;

FIG. 7B illustrates a continuation of the exemplary process flow of FIG. 7A according to various embodiments for the analysis module 500 shown in FIGS. 2 and 5;

FIG. 8 illustrates an exemplary process flow according to various embodiments for the report module 600 shown in FIGS. 2 and 5;

FIG. 9 illustrates an exemplary process flow according to various embodiments for the mitigation module 700 shown in FIGS. 2 and 5; and FIG. 10 illustrates an exemplary architectural configuration for the system 20 according to the various embodiments also illustrated in FIGS. 1-9.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Generally speaking, various embodiments are configured to provide tools within systems, methods, and computer program products for providing real-time verification, validation, mitigation, and/or confirmation/approval of container loading and positioning data prior to departure of the vehicle, craft, or vessel upon which the containers (or packages) have been loaded. As a non-limiting example, the tools may be configured so as to enable an aircraft ramp loading supervisor to, via a mobile device, receive planned aircraft load data, whether associated with a draft manifest or otherwise. Upon receipt of such data, the ramp supervisor may, via a verification tool, verify at least the actual weight of one or more received containers or packages by comparing actual observed or acquired data to expected or planned weight data. If discrepancies are identified, as may be determined based upon one or more user-pre-established parameters and/or thresholds, such may be communicated to a mitigation tool for the purpose of identifying solutions to substantially reduce or eliminate the discrepancies. The verification may be re-performed in certain instances to confirm sufficient reduction and/or elimination of any identified discrepancies. The ramp supervisor may then transmit such verification data electronically to loading personnel.

Upon receipt of verified data, at least relative to actual observed weight of containers or packages arriving and ready for loading upon the aircraft, the loading personnel may, via a mobile device of their own and in accordance with the various embodiments described herein verify actual loaded positions of those containers or packages against the planned loaded positions. Notably, such is configured to occur in a real-time or near real-time fashion, permitting mobility of the loader personnel throughout the aircraft during the loading thereof, and also enabling identification and notification of any discrepancies to mitigation and/or reporting tools. In certain instances, discrepancies may be fixed or otherwise substantially eliminated in a near real-time fashion, thus preventing costly delay, unloading, and/or reloading procedures, as would be necessary with less than real-time configurations.

Using the mobile device according to various embodiments, the ramp supervisor may also electronically perform a final electronic aircraft load confirmation, for example, upon receipt of a notification or alert that verification and validation of the load and position data has been completed by the loading personnel. Once confirmed, a finalized load manifest may be generated and transmitted electronically (or otherwise) to the flight crew, and potentially still other users of the system, such that the aircraft is deemed ready for departure. Throughout the above, which will be referred to throughout herein as a non-limiting example, various reports and/or notification may be generated and/or transmitted to one or more users of the system via a report tool, whether in conjunction with a mitigation tool or any one of the verification, validation, or confirmation tools employed by the ramp supervisor and the loading personnel.

Although additional details in this regard and otherwise will be provided elsewhere herein, it should be understood that, in this manner, the various embodiments described herein are thus configured to provide electronic, mobile, and real-time verification, validation, and confirmation of load and position data throughout the duration of a loading process of an aircraft or other vessel or vehicle carrying cargo containers or packages. As a result, costly post-load manual checks, whether side-by-side comparisons of clipboards or otherwise, are avoided, along with delays and/or fines incurred as a result of discrepancies identified only upon completion of the loading process. Also eliminated are face to face Load Manifest Accuracy Checks (LMACs), as real-time load supervisor and loading personnel visibility is provided relative to expected and actual container positioning, loading, and weight data (as non-limiting examples). Additional details in this regard, as mentioned, are provided further below.

Exemplary Apparatuses, Methods, Systems, Computer Program Products, & Computing Entities Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary Architecture of System 20

FIG. 1 is a block diagram of a system 20 that can be used in conjunction with various embodiments of the present invention. In at least the illustrated embodiment, the system 20 may include one or more central computing devices 110, one or more distributed computing devices 120, and one or more distributed handheld or mobile devices 300, all configured in communication with a central server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the server 200 are illustrated in FIG. 1 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to one embodiment, in addition to receiving data from the server 200, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by UPS.

Turning momentarily to FIG. 10, an exemplary architectural configuration 1000 for the system 20 according to the various embodiments also illustrated in FIGS. 1-9 is illustrated. As may be understood therefrom, at least three layers may exist in certain embodiments, providing presentation (e.g., visualizations to one or more users of the system 20), business processing (e.g., performance of the checks, verifications, and validations, along with processing and handling of flight preparation logs and the like), and persistence (e.g., data storage and retrieval) capabilities. Presentation capabilities may, in certain embodiments, provide a load or ramp supervisor web (or mobile device) application 1001, via which the various communications and transmissions, whether reports, alerts, or otherwise are delivered to the user, as described elsewhere herein. Presentation capabilities may also comprise a cargo compartment designee application 1002, which may be accessible to one or more load personnel, as detailed elsewhere herein, also for data capture and alert or report notification purposes. A third degree of presentation capability may also be provided in load planner application(s) 1003, which may be provided to one or more users of the system other than the ramp supervisor and the load personnel, for example the non-limiting possibilities of common transit carrier providers, aircraft flight crew personnel, and third party entities responsible for determining and verifying center of gravity calculations, as described elsewhere herein.

Business processing capabilities comprise, according to various embodiments, load manifest accuracy checks 1010 (or confirmation checks, as detailed elsewhere herein), validation services 1020 (which may encompass verification and validation procedures as detailed elsewhere herein), flight services 1030 (which may encompass flight manifests and/or other deliverables provided by the system 20 to one or more users upon confirmation of load completion and accuracy), and logging services 1040, as may enter and/or retain various data parameters for future and/or ongoing reference by one or more users of the system, as may be desirable. Persistence capabilities provide storage of expected data in a DWB Oracle database 1050 (or the like, as detailed elsewhere herein), from which expected data may be retrieved upon receipt of actual/observed real-time data, and also into which the actual/observed or otherwise logged data, whether load or flight related may be placed for storage and/or future reference.

As may be understood further from FIG. 10, the various layers, presentation, business processing, and persistence layers are configured according to various embodiments to inter-communicate with one another in both one-directional and two-directional manners, upon occurrences of various scenarios, such occurrences and such communication protocols as will be described elsewhere herein with reference to at least FIGS. 5-9, detailing process flows for various modules configured to execute various business processing tools of the system 20 detailed herein.

Exemplary Server 200

In various embodiments, the server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed device(s) 110, 120, and/or the handheld or mobile device(s) 300, as may be desirable for particular applications. As will be described in further detail below, in at least one embodiment, the handheld or mobile device(s) 300 may contain one or more mobile applications 330 which may be configured so as to provide a user interface for communication with the server 200, all as will be likewise described in further detail below.

FIG. 2A is a schematic diagram of the server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200. Various ROM and RAM configurations have been previously described herein.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, an analysis module 500, a report module 600, and a mitigation module 700. In these and other embodiments, the various modules 400, 500, 600, 700 control certain aspects of the operation of the server 200 with the assistance of the processor 230 and operating system 280. In still other embodiments, it should be understood that one or more additional and/or alternative modules may also be provided, without departing from the scope and nature of the present invention.

In various embodiments, the program modules 400, 500, 600, 700 are executed by the server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed. The operation and interaction of the program modules 400, 500, 600, 700 is described in further detail elsewhere herein.

In various embodiments, it should also be understood that one or more of the modules 400, 500, 600, 700 may be alternatively and/or additionally (e.g., in duplicate) stored locally on one or more of the devices 110, 120, and/or 300 and may be executed by one or more processors of the same. According to various embodiments, the modules 400, 500, 600, 700 may send data to, receive data from, and utilize data contained in one or more databases (see FIG. 4), which may be comprised of one or more separate, linked and/or networked databases.

Also located within the server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Distributed Handheld (or Mobile) Device(s) 300

FIG. 2B provides an illustrative schematic representative of a mobile device 300 that can be used in conjunction with various embodiments of the present invention. Mobile devices 300 can be operated by various parties. As shown in FIG. 2B, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the server 200, the distributed devices 110, 120, and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a camera 326 and a mobile application 330. The camera 326 may be configured according to various embodiments as an additional and/or alternative data collection feature, whereby one or more items may be read, stored, and/or transmitted by the mobile device 300 via the camera. The mobile application 330 may further provide a feature via which various tasks may be performed with the mobile device 300. Various configurations may be provided, as may be desirable for one or more users of the mobile device 300 and the system 20 as a whole.

Server 200 Logic Flow

Reference is now made to FIGS. 3-9, which illustrate various logical process flows executed by various embodiments of the modules described previously herein. In particular, FIG. 3 illustrates the overall relationship of the modules 400, 500, 600, 700 of the server 200, according to various embodiments. As illustrated, operation of the system 20 via the server 200 begins, according to various embodiments, with the execution of the data module 400, which receives, stores, manages, and transmits a variety of data, such as the non-limiting examples of expected load data 401, actual load data 402, manifest data 403, and mitigation data 404.

At least portions of the data 401-403 is provided, as desirable, to the analysis module 500, as will be described in further detail below. The mitigation data 404, which may be optional and even non-existent in certain embodiments, as will be described in further detail elsewhere, may be exchanged, both to and from, at least the mitigation module 700, as will also be described in further detail below. In other embodiments, where present, the mitigation data It should be understood, of course, that according to various embodiments, any portion of the data 401-404 may be exchanged in a one or two directional fashion between any set combinations of the modules 400-700 of the server 200, as may be desirable.

The analysis module 500 is generally configured according to various embodiments to execute one or more tools (e.g., a verification tool 510, a validation tool 520, and/or a confirmation (aka "confirm. tool" In FIG. 5) tool 505) to enable one or more users of the system 20 to validate actual container or package data (e.g., non-limiting examples of ULD numbers, weights, load positions, and lock status parameters) against planned container or package data (e.g., non-limiting examples of ULD numbers, weights, load positions, and lock status parameters). In this manner, according to various embodiments, execution of the various tools of the analysis module 500 is configured to result in a real-time validation that the containers or packages are safely, efficiently, and accurately loaded onto a vehicle or aircraft prior to the departure thereof. Such may comprise in certain embodiments an initial verification of container weight via the verification tool 510, followed by validation of container load location via the validation tool 520, followed further by confirmation of an accurate and complete "load to position" process via the confirmation tool 505. Each of these tools may be executed by one or more distinct users of the system 20, as will be detailed elsewhere herein.

Still further, according to various embodiments, upon execution of the verification, validation, and/or confirmation tools 510, 520, and/or 505, the analysis module 500 may be configured to transmit any generated verification data 515, validation data 525, and/or confirmation data 504 to the report module 600. In certain embodiments, a finalized manifest 503 may also be generated and transmitted to the report module 600. Upon receipt thereof, the report module 600 is configured according to various embodiments to generate one or more reports 612 and/or alerts 614, which may include any generated data, manifests, or the like and/or an indication thereof for purposes of notifying the users of the data and/or of a discrepancy identified and associated therewith, all as will be described in further detail elsewhere herein.

As alluded to, in certain embodiments, the various tools 510, 520, and/or 505 may be configured to generate verification, validation, and/or confirmation data, each of which as may comprise a determination or identification of one or more discrepancies between expected and actual (e.g., observed) container weight or load position data. In certain embodiments, where a discrepancy, whether a difference relative to a required exact match or a deviation beyond a pre-established threshold or tolerance about an exact match, is identified, such may be transmitted by the analysis module 500 to the report module 600 for further processing, including the generation of notifications to one or more users of the existence of the discrepancy. In at least one embodiment, such alert or report may be configured to stop further loading activities pending review of the discrepancy. In these and still other embodiments, in addition to transmitting such data to the report module 600 the tools of the analysis module 500 may be also configured to transmit such to a mitigation module 700. Therein, a mitigation tool 710 may be configured according to various embodiments to determine and/or initiate implementation of one or more mitigation activities, as may have been pre-established or pre-determined by one or more users of the system, based at least in part upon the nature of the identified discrepancy. Instructions 715 may be generated and also transmitted to the report module 600, which instructions may direct the one or more users of the system on real-time or near real-time mitigation activities, such as realignment or reloading of packages or containers so as to eliminate the discrepancy.

These and other details will, of course, be described in further detail below. Specifically, detailed steps performed by various embodiments of the data module 400 are described in relation to FIG. 6; steps performed by various embodiments of the analysis module 500 are described in relation to FIGS. 7A-B; steps performed by various embodiments of the report module 600 are described in relation to FIG. 8; and steps performed by various embodiments of the mitigation module 700 are described in relation to FIG. 9.

Figure 4:
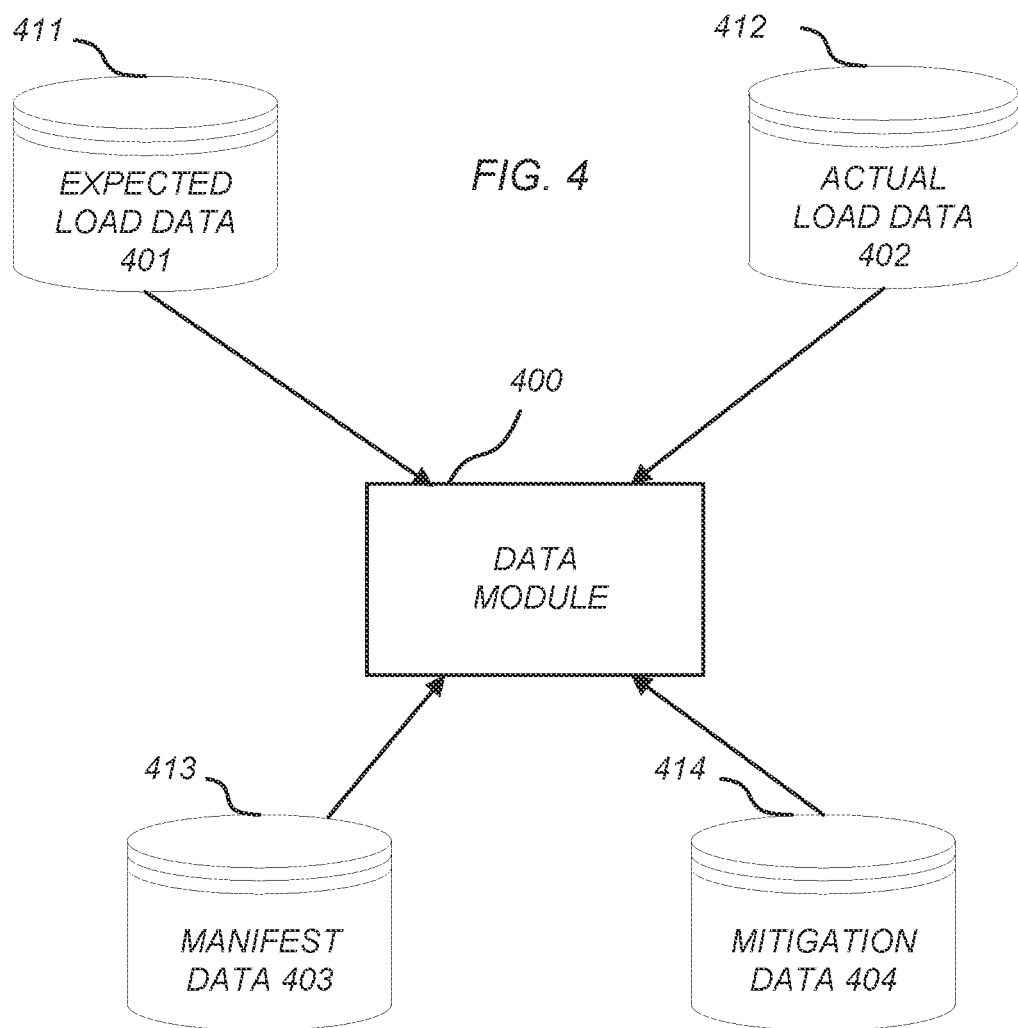
FIG. 4 illustrates a schematic diagram of various databases that are utilized by the system 20 shown in FIG. 1 according to various embodiments.

With reference now to FIG. 4, such illustrates a block diagram of various exemplary databases via which the data module 400 manages a variety of data (see also FIG. 5). In particular, in at least the embodiment shown in FIG. 4, the following databases are provided: an expected load data database 411, an actual load data database 412, a manifest data database 413, and a mitigation data database 414. Although the embodiment of FIG. 4 shows these databases 411, 412, 413, 414 as being separate databases each associated with different types of data, in various other embodiments, some or all of the data may be stored in the same database. In still other embodiments, additional and/or alternative databases may be provided, as may also be desirable for particular applications.

According to various embodiments, the expected load data database 411 may be configured to store and maintain a variety of expected load data 401. In certain embodiments, the expected load data 401 may comprise information concerning one or more containers, cargo parcels, or packages that is scheduled for transport on one or more vehicles, vessels, or aircraft. In certain embodiments, the expected load data 401 comprises at least the non-limiting examples of ULD number data, weight data, position data, lock sequence data, and the like. The ULD number data may be any of a variety of container or cargo or package identifies, as such are commonly known and understood in the art and such is configured according to various embodiments herein so as to provide a unique identifier for each handled item, so as to compare expected versus actual data, as will be described elsewhere herein. The ULD number data may further comprise any of a variety of commonly known and understood package tracking data, including a tracking identifier and otherwise. The weight data according to various embodiments comprises an anticipated or expected weight of the cargo, parcel, container, or package being shipped and handled by users of the system 20 described herein. The weight data may be estimated in any of a variety of fashions, as commonly known and understood in the art for package handling, transit, and the like. Still further, in certain embodiments, the weight data may comprise container or carton-based weight, for example, where consolidated shipments are involved; however, in other embodiments, the weight data may comprise additionally and/or alternatively weight data for each package or item within a consolidated container or shipment.

The anticipated or expected position data and lock sequence (i.e., load sequence) data may be based at least in part upon calculations performed by systems and/or tools external to the system 20 described herein. For example, in certain embodiments, the predetermined (e.g., expected) position may be allocated by a separate program that takes into consideration not only weight data but also center of gravity computations for each container (or package or item) and corresponding center of gravity computations for the vehicle or aircraft upon which transport will occur. As commonly known and understood in the art, certain aircraft, for example, have specific and discrete center of gravity computations that must be complied with, whether in an exact fashion or within a pre-established tolerance thereto. As a result, the position of each container or package, upon loading thereof, must be such that the center of gravity of the aircraft or vehicle, in its entirety, is within the required parameters and/or tolerances. In certain instances, it may be desirable to ensure the parameters and tolerances are satisfied only upon complete loading of the aircraft or vessel; in other instances, some degree of thresholds that must be preserved may be further incorporated during the loading process itself (e.g., prior to load completion).

As mentioned, the expected load data 401 may further comprise load sequence or lock sequence data, which according to various embodiments may include instructions for a particular order in which each of the containers or packages are intended to be loaded onto the vehicle or aircraft. Such may take into account the center of gravity of calculations, as previously detailed herein, and also be determined by a program or system separate and distinct from the system 20 described herein. Of course, in certain embodiments, it may be desirable to further perform load sequence and position determination calculations integrally with the system 20 described herein, without departing from the scope and nature of the present invention. In at least one embodiment, as will be described in further detail elsewhere herein, where a mitigation module 700 is incorporated within the system 20 such module and associated mitigation data 404 may comprise, as non-limiting examples, instructions for recalculating weight, position, center of gravity, load sequence, and lock sequence/status data, in efforts to mitigate an identified discrepancy. In still other embodiments, the mitigation module 700 may return to external databases and/or programs to request re-calculated center of gravity computations for a particular aircraft type and/or other load optimization parameters.

It should be understood that according to various embodiments, a variety of types and details regarding expected load data 401 may be stored within the expected load data database 411, however as may be desirable and/or beneficial for purposes of verifying and validating load manifest accuracy of observed data (described further below) against the expected load data. Any of a variety of parameters may be of interest, with focus upon optimizing load characteristics for safety, efficiency, and still other motivating factors. It should further be understood that the expected load data 401 within the database 411 may be received in its entirety (or piecemeal) from a variety of sources, either external or internal to the system 20 described herein, as may be appropriate given particular applications. As a non-limiting example, in certain embodiments, at least a portion of the expected load data 401 may be based at least in part upon externally calculated center of gravity computations based upon a particular aircraft type and/or configuration upon which the containers and/or packages are to be loaded upon for transit.

In all of these and still other embodiments, it should be understood that, upon receipt of at least some portion of expected load data 401, the expected load database 411 will store any newly received data in a manner associated with at least the data module 400 and for provision (whether automatically, manually, upon query therefor, whether now or at a later time) to one or more of the modules 500-700, as will also be described in further detail below. In certain embodiments, any updated or newly received expected load data 401 will be stored and provided to at least the analysis module 500 upon further receipt of at least a portion of actual (e.g., observed in real time) load data 402, as will be described in further detail below. Of course, in any of these and still other embodiments, a variety of alternative configurations and/or components of consignor data 401 may exist, as may be desirable for certain applications.

According to various embodiments and with continued reference to FIG. 4, the actual load data database 412 may be configured to store and maintain actual (e.g., observed) load data 402. In certain embodiments, the actual load data 402 comprises at least the non-limiting examples of ULD number data, weight data, position data, lock sequence data, and the like. Notably, in these and still other embodiments, the data comprised within the actual load data 402 is substantially the same type of data as that found within the expected load data 401. However, in contrast with these same types of data within the expected load data 401, the actual load data 402 is not anticipated, estimated, or otherwise predicted prior to arrival of the containers or packages at the vehicle or aircraft upon which transit will occur. Instead, according to various embodiments, the actual load data 402 is that which is observed in a real-time fashion by load supervisors, loading personnel, and other users of the system 20 associated with the load to position processes and procedures described herein.

According to various embodiments, at least portions of the actual load data 402 may be observed and/or otherwise recorded into the system by ramp supervisors and/or load personnel, each via one or more mobile devices and/or distributed computing devices of the system 20, as have been described previously herein. In at least one embodiment, the actual load data 402 may be obtained via the mobile device, for example, by scanning therewith a portion of one or more containers or packages during and/or upon the loading thereof into the vehicle or aircraft. In this and still other embodiments, the mobile and/or remove devices of the system 20 may be equipped with data capture features, whether a camera, a barcode scanner, an image scanner, or the like, all as are commonly known and understood in the art so as to facilitate real-time, flexible, and/or mobile capture and recordation of data by one or more users.

According to various embodiments, it should be understood that, upon receipt, the actual load data database 412 will store any such actual load data 402 in a manner associated with at least the data module 400 and for provision (whether automatically, manually, upon query therefor, whether now or at a later time) to at least one of the modules 500-700, as will also be described in further detail below. In at least one example, upon receipt of an actual container or package weight (as may be contained within the actual load data 402) and captured by a ramp supervisor, the data module may be configured to automatically transmit such data to at least the analysis module 500 for further processing, as will be described elsewhere herein.

According to various embodiments, the manifest data database 413 may be configured to store and maintain a variety of manifest data 403. Generally speaking, the manifest data 403 may comprise the non-limiting examples of a draft manifest for reference and further population via the system 20 described herein, as observed or actual load data is verified against expected load data. For example, the manifest data 403 may comprise a partially populated manifest that identifies the containers and/or packages slated for transit on a particular vehicle or aircraft, whereby at least weight and load position data is left either unpopulated or in "draft form," as may be based upon only expected load data 401, as described elsewhere herein. In other embodiments, no draft manifest may be provided, whereby it may be desirable in certain circumstances to have users capture data prior to any comparison or notification thereof. In any of these and still other embodiments, it should be understood that, upon receipt, the manifest data database 413 will store any such manifest data 403 in a manner associated with at least the data module 400 and for provision (whether automatically, manually, upon query therefor, whether now or at a later time) to at least one of the modules 500-700, as will also be described in further detail below.

The manifest data 403 may according to various embodiments include further one or more pre-established or pre-determined parameters, as may be set by one or more users of the system and/or by shippers of the containers in transit and/or by operators (or regulators) of the aircraft of vehicle upon which transit occurs. Such portions of the manifest data 403 may in certain embodiments set forth a degree of difference that may warrant identification as a discrepancy, whereby, as a non-limiting example, for a container expected to weigh ten pounds, a difference of less than a tenth of a pound therefrom is considered acceptable. As another non-limiting example, the manifest data 403 may include user or operator defined thresholds, whereby any difference beyond a 1% threshold is considered unacceptable and identified as a discrepancy so as to trigger the report module 600, as described elsewhere herein. It should be understood, however, that this parameter-based portion of the manifest data 403 may include one or more parameters of any of a variety of degrees or types, associated with weight or otherwise (e.g., position), as may be desirable to further automate the processes implemented by the system 20 described herein. It should also be understood that any updated manifest data 403 may be configured to either complement or overwrite previously existing manifest data, as requirements may be added, removed, or modified over time by one or more regulatory entities within one or more jurisdictions. That being said, in any of these and still other embodiments, it should further be understood that a variety of alternative configurations could also exist, however as may be desirable for various applications.

Returning to FIG. 4, according to various embodiments, the mitigation data database 414 may be configured to store and maintain a variety of mitigation data 404. Generally speaking, the mitigation data 404 may include data associated with one or more mitigating actions, as may be facilitated or implemented by the system 20 upon determination of an unsuccessful verification (e.g., a difference in actual weight versus expected weight, on a package, container, or manifest level), validation (e.g., a difference in actual load position versus expected load position), or confirmation (e.g., a difference in the final versus draft manifest or otherwise "overall" data set, upon completion of loading that wasn't otherwise captured via verification and/or validation procedures). In certain embodiments, the system may be configured to present the mitigation data 404 as options for user selection (e.g., upon notification of the need therefor via the report tool 610 or otherwise). In other embodiments, the mitigation data 404 may also include one or more pre-determined mitigation actions, as may be pre-established by one or more of the users of the system. In this manner, it should be understood that the mitigation module 700 may be configured to automatically (or manually, or upon alert and approval from a user of the system) initiate a mitigating action upon detection of a potential violation or discrepancy that could result in an unsafe or unauthorized loading of the aircraft, such that the occurrence thereof may be addressed and substantially eliminated in an efficient and timely manner.

In any of these and still other embodiments, it should be understood that, upon receipt, the mitigation database 414 will store any such mitigation data 404 in a manner associated with at least the data module 400 and for provision (whether automatically, manually, upon query therefor, whether now or at a later time) to at least one of the modules 500-700, as will also be described in further detail below. Of course, in any of these and still other embodiments, a variety of alternative configurations could exist, as may be desirable for particular applications.

Although not specifically illustrated in FIG. 4, it should be understood from FIG. 5 that according to various embodiments, the report tool 610 is configured to generate one or more reports 612 and/or alerts 614, the content of which may be further stored within one or more of the previously detailed databases 411-414. In certain embodiments, however, an additional database may be provided for distinct storage, maintenance, and provision of report data, as may comprise at least any current and/or historical reports and/or alerts 612-614. In yet another embodiment wherein instructions 715 may be generated via a mitigation tool 710, such instruction data may also be stored within a pertinent one or more of the previously detailed databases 411-414, depending upon the nature and content of the instructions. In one embodiment, such instructions 715 may be saved in the mitigation data database 414 as a portion of complementary mitigation data 404 as may be relied upon for future reference. In still other embodiments, the instructions 715, reports 612, and/or alerts 614 may all be stored in a separate and distinct database, although such is not illustrated specifically in FIGS. 4 and 5.

Still further, in any of these and still other embodiments, it should be understood that, upon receipt of any externally calculated or provided data, for example that of the separate program that takes into consideration the center of gravity computations for a particular aircraft type, such data may be complementarily stored within one or more of the previously detailed databases 411-414, should mitigation activities be necessary and involve some degree of repositioning and/or recalculation of centers of gravity for purposes of repositioning. Of course, in the illustrated embodiment of FIGS. 4 and 5, it should be understood that in such instances, it is envisioned that the mitigation module 700 may be configured, where such recalculation is necessary, to re-query the separate external program or system and receive anew recalculated data therefrom, as will be described in further detail elsewhere herein. Of course, in any of these and still other embodiments, a variety of alternative configurations could exist, as may be desirable for particular applications.

According to various embodiments, any of the previously described databases may be configured to store and maintain not only textually based data, but also graphically based data, as may be generated by the system 20 (or otherwise) and be based, at least in part, upon the textually based data. Still further graphical (e.g., charts, graphs, maps, etc.) may also be stored within one or more of the databases, wherein such may be, at least in part, independently derived, relative to the textually based data. Non-limiting examples of such graphically based data include aircraft load maps, center of gravity maps, diverging data charts, plot charts, diagrams, and the like, all as should be generally known and understood in the art, and all as will be described in further detail in the particular context of the report module 600. In any event, it should be understood that in any of these and still other embodiments, the graphically based data may be used to visually combine various portions of data contained within the various databases previously described herein. Still further, various algorithms and/or pre-determined parameters, rules, and/or mitigating procedures may also be stored in any of the various databases within the system 20, as may be desirable for various applications, to the extent such have not been previously described and/or allocated herein.

Summary of Exemplary System Operation

As indicated above, various embodiments of the server 200 execute various modules (e.g., modules 400, 500, 600, 700) for providing real-time verification, validation, mitigation, and/or confirmation/approval of container loading and positioning data prior to departure of the vehicle, craft, or vessel upon which the containers (or packages) have been loaded. Such provides users of the system 20 with improved visibility of potential and/or existing violations and/or discrepancies, so as to facilitate an improved real-time or near real-time identification thereof for mitigation and/or other remedial actions that are less costly than conventionally encountered unloading/reloading processes and manual side-by-side checks susceptible to human-introduced errors and inconsistencies. In this manner, various embodiments of the system 20 and the associated server 200 and modules enables consignors and carriers (who may provide the system 20) to avoid incurring fines and perhaps worse consequences for continued and/or new violations involving shipment of restricted and/or regulated goods without proper authorization and/or without adhering to any and all necessary regulatory requirements.

Turning now though with reference to FIG. 5, according to the embodiment shown therein as incorporating the various modules described elsewhere herein, the server 200 begins with the execution of the data module 400, which is configured to receive, store, manage, and transmit a variety of expected load data 401, actual load data 402, manifest data 403, and/or mitigation data 404, the details of which have been described previously herein. In certain embodiments, at least a portion of the data 401-403 is provided to the analysis module 500 for further processing, either automatically upon, for example, receipt of at least a portion of at least actual load data 402 or otherwise. In at least the illustrated embodiment of FIG. 5, manifest data 403 and/or expected load data 401 may be additionally and/or alternatively provided to the analysis module 500 upon receipt thereof or otherwise, for example, in response to and subsequent to receipt of actual load data 402. Still further, the mitigation data 404 may be provided to the mitigation module 700, for example, so as to enable real-time and/or automatic facilitation of actions to mitigate or otherwise reduce or eliminate the impact and/or existence of any identified discrepancies, as may be uncovered by the analysis module 500, as detailed below. It should be understood however that various alternatives may exist within the configured processes of the data module 400, all as will be described in further detail below.

In various embodiments, remaining with FIG. 5 and its illustration of the overall interactive nature of the various modules, the analysis module 500 is configured to receive various pieces of the data, for example at least some portion of expected load data 401, actual load data 402, and/or manifest data 403, whether collectively or individually. Upon receipt of at least one type of data 401-403, according to various embodiments, the analysis module 500 is configured to at least execute one or more tools to determine whether one or more discrepancies or differences exist between at least the expected data (as may be obtained via and from a separate Weight and Balance system (DWB)) and the actual observed data (as may include at least ULD data, weight data, and/or position data). In at least the illustrated embodiment, such tools comprise a verification tool 510, a validation tool 520, and a confirmation tool 505, although additional and/or alternative tools may be provided. The tools 510, 520, 505 are configured to generate verification data 515, validation data 525, and confirmation data 504, respectively, the details of which are described, in turn and in further detail, elsewhere herein. In at least the illustrated embodiment, the final confirmation tool 505 may be further configured to generate a finalized manifest 503 based at least in part upon the confirmation data 504.

As a non-limiting example, as will be referred to throughout herein, the received data may comprise actual load data 402, as may be observed, captured, or otherwise recorded by a ramp supervisor overseeing receipt of one or more containers or packages for loading and subsequent transport on an aircraft. According to various embodiments, such receipt may be via a mobile handheld or otherwise distributed device operated the ramp supervisor and the captured data may at least initially comprise container or package weight or manifest weight, related to the total weight of all of the containers or packages in the delivery. Upon receipt thereof, such data, along with at least a portion of the expected load data 401, namely expected weight data for the container and/or manifest are transmitted to at least the verification tool 510 of the analysis module 500 for further processing.

Upon receipt of the above-noted data 401-402, according to various embodiments, the verification tool 510 is configured to identify any discrepancies there-between, for example whether the actual observed or otherwise captured real-time weight is more or less than that originally expected (as based upon the expected data). According to various embodiments, such calculation and/or determination generates verification data 515, which may comprise at least an indication of whether one or more discrepancies exist. In certain embodiments, if one or more discrepancies are identified, such indication may be transmitted via the verification tool 510 to a mitigation tool 710 to facilitate elimination (or otherwise handling) thereof, as detailed further below. Additionally and/or alternatively (for example, in those embodiments not including a mitigation tool 710) the verification data 515 may be transmitted to the report tool 610, whereby one or more reports and/or alerts (e.g., notifications) may be generated and/or transmitted further to one or more users of the system, as necessary and/or desirable.

According to various embodiments, upon generation of verification data 515, in certain instances such will comprise an indication that no discrepancies were identified via execution of the verification tool 510, in which case such data, along with further portions of the expected and actual data 401-402 and/or manifest data 403 (e.g., user-defined parameters or thresholds) is transmitted further to the validation tool 520. Upon receipt thereof, the validation tool 520 is configured according to certain embodiments to validate that actual positioning or loading of the containers matches (or remains within a tolerance or threshold) of the expected positioning or loading, as may have been calculated based at least in part upon external center of gravity determinations, as previously described herein. Validation data 525 may be generated, which may, similarly to the verification data 515 indicate the existence of one or more discrepancies. Where discrepancies exist, the data 515 may be transmitted to the mitigation tool 710 and/or the report tool 610; otherwise, the validation data 525 may be provided to the confirmation tool 505 for final disposition and analysis.

Upon receipt of validation data 525 indicative of a discrepancy-free load, both with respect to weight and position of containers, the confirmation tool 505 according to various embodiments is configured to perform one or more final checks upon the analyzed data. For example, in certain embodiments, the confirmation tool 505 may be configured to confirm that upon positioning, each container has been locked into place. As another non-limiting example, in certain embodiments, the confirmation tool 505 may be configured to generate a finalized manifest 503, containing thereon updated portions of a previously received manifest, as may have been revised due to the initial identification of one or more discrepancies (as may have been mitigated or otherwise addressed).

Notably, in certain embodiments, execution of the validation tool 520 may be via a device operated by loader personnel, as compared with execution of the verification and confirmation tools 510, 505, which may be via a device operated by a ramp supervisor. Of course all such devices are contained within the system 20 described herein and configured to communicate via one or more networks, as previously described.

According to various embodiments, upon receipt of the finalized manifest 503, confirmation data 504, validation data 525, verification data 515, and the like, the report module 600, with continued reference to FIG. 5 is configured to execute the report tool 610 so as to generate one or more reports 612 and/or alerts 614. Alerts may, in certain embodiments, be configured primarily for instances wherein one or more discrepancy has been identified, although in other embodiments even where no discrepancies exist, it may be desirable or otherwise preferable to alert or notify one or more users of the system 20 of new data, even where such is not problematic or issue-causing. Reports 612 may likewise be generated under a variety of circumstances and may be further transmitted to one or more users of the system, as may be desired, required, or otherwise pre-established by users of the system or by external third parties thereto.

Remaining a bit further with FIG. 5, in certain embodiments, the analysis module 500 may be configured to further transmit data generated thereby (e.g., verification data 515, validation data 525, and/or confirmation data 504 to the mitigation module 700, which may be configured to assess the identified discrepancies and, via a mitigation tool 710, generate one or more instructions 715 for resolving, minimizing, and/or otherwise eliminating the same. In certain embodiments, the mitigation tool 710 may further evaluate mitigation data 404 during its generation of instructions, whereby the mitigation data, as previously described herein, may comprise one or more pre-determined parameters and/or actions that may be pre-configured to execute upon occurrence of a discrepancy. Such instructions 715 may be, according to various embodiments, transmitted by the mitigation module 700 to at least the report module 600. In certain embodiments, the analysis and mitigation modules 500, 700 may be configured such that upon completion of mitigation activities (as identified via execution of the mitigation tool 710 or otherwise), an indication thereof may be transmitted in a two-way manner back to one or more of the verification, validation, and/or confirmation tools 510, 520, and/or 505. In such and still other embodiments, the tools may be configured to re-execute such tools so as to ensure sufficient mitigation has occurred, whereby, if so, the analysis module 500 may operate substantially as has been described previously herein.

It should, of course, be reiterated and understood that the system 20 according to certain embodiments may not include a mitigation module 700, as may be desirable for particular applications and such should be considered within the scope of inventive concepts described herein and as not departing from the nature thereof. That being said, further details in this regard, and with respect to iterative communication exchanges between the analysis, report, and mitigation modules 500-700 will be described in further detail, in turn, below.

Data Module 400

According to various embodiments, as previously mentioned herein, the data module 400 is configured to receive, store, manage, and transmit a variety of expected load data 401, actual load data 402, manifest data 403, and mitigation data 404. Receipt may be from any of a variety of entities (e.g., a ramp supervisor, load personnel, aircraft operators, third party entities and/or programs, a common carrier service provider, a regulatory entity, or otherwise) and transmission may be to one or more of the modules 500-700, as will be described in further detail below. In certain instances, transmission may be one-way, only to the one or more modules 500-700 for further process; however, in other embodiments, at least some transmissions may be two-way, for example, where mitigation data 404 is both transmitted to and subsequently received (e.g., upon implementation of mitigating actions) from the mitigation module 700.

FIG. 6 illustrates steps that may be executed by the data module 400 according to various embodiments. Beginning with step 420, the data module 400 assesses whether any data (e.g., expected load data 401, actual load data 402, manifest data 403, and/or mitigation data 404, all as illustrated in FIG. 5) has been received by the module. In certain embodiments, the data module 400 makes this assessment by periodically scanning one or more databases (see FIG. 4) associated with the module and by identifying some portion of data within one or more of the databases that was not present during a previous periodic scan under step 420. Of course, alternative configurations may be envisioned, wherein, as a non-limiting example, the data module 400 may actively receive data (e.g., as input by a user of the system 20 via an interface, whether web-based or otherwise) and upon receipt thereof, execute step 430. As a non-limiting example, as has been referenced elsewhere herein, the data module may be configured according to certain embodiments to automatically transmit actual load data 402 upon receipt thereof to at least the analysis module 500 so as to in a real-time (or near real-time) fashion initiate execution of the various tools therein to verify and validate actual/observed data against expected data parameters, thus efficiently and effectively identifying discrepancies, as will be described further below.

As previously mentioned, with reference again to FIG. 6, in any of these and still other various embodiments, if "newly received" data 401-404 is identified, the data module 400 proceeds to step 430; otherwise the module proceeds into a static loop via step 425. During step 425, the data module 400 may be configured to passively stand by for receipt of new data. In certain embodiments, the module 400 may, in step 425, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

According to various embodiments, during step 430, the data module 400 is configured to transmit at least a portion of data 401-404 to at least the analysis module 500. In certain embodiments, portions of the data may be alternatively and/or additionally transmitted to at least the mitigation module 700. In these and other embodiments, such transmission to various modules may be simultaneously, while in still other embodiments, transmission may be sequential and temporally spaced, as may be desirable or necessary for particular applications. For example, mitigation data 404 may be transmitted only upon subsequent identification of one or more discrepancies and execution of the mitigation tool 710 to determine one or more available and/or appropriate actions to rectify the same. In these and still other embodiments, only a portion of the data may be transmitted automatically upon receipt thereof (e.g., the actual or observed load data 402 as it is being captured by users of the system in a real-time fashion), while receipt of other data (e.g., expected load data 401 and/or manifest data 403) may not result in any automatic transmission thereof prior to receipt further of actual load data 402.

Of course, various configurations may be envisioned, whereby, in certain embodiments, the data module 400 may be configured to automatically perform step 430, while in other embodiments, the module may perform such only periodically, at an interval predetermined by one or more users of the system 20, as may be desirable for particular applications. In any of these and still other embodiments, any portion of the data may be otherwise exchanged, whether automatically or upon request therefor, with or from the remaining module 500-700, as may be desirable for certain applications, as compared with the provision of such data from and by the data module 400 as an initiator thereof.

Analysis Module 500

As previously described, upon receipt and/or retrieval of actual load data 402 (e.g., that data observed and/or otherwise recorded upon arrival of containers and packages at an aircraft or vessel for loading there-upon), the analysis module 500 is configured to at least execute one or more tools to determine whether any discrepancies exist between various portions of the received data and what was expected therefor, as documented within the expected load data 401. In at least the illustrated embodiment, such tools comprise a comparison tool 510, a validation tool 520, and a confirmation tool 505, although additional and/or alternative tools may be provided. The tools 510, 520, 505 are configured to generate verification data 515, validation data 525, and confirmation data 504, respectively, which data may comprise identification of whether one or more discrepancies exist that result in unsuccessful verifications, validations, and/or confirmations, which may require further scrutiny (see also details surrounding report module 600 and mitigation module 700). Further details in this regard are provided below.

With reference now to FIGS. 7A-B, which illustrate various steps that may be executed by the analysis module 500, according to various embodiments the module is configured to begin in step 530 by receiving at least some portion of data from the data module 400. It should be understood that in certain embodiments, the analysis module 500 may be configured to periodically and/or continuously proactively retrieve and/or check for new data, as may be transmitted from the data module 400. In other embodiments, the analysis module 500 may merely passively await receipt of data from the data module, as may be desirable for particular applications.

According to various embodiments, data received in step 530 must generally comprise at least some portion of actual load data 402 so as to initiate execution of the analysis module 500. For example, in certain instances, expected load data 401 may be received by the system and/or transmitted to one or more users thereof, in anticipation of receipt of one or more containers or packages for loading upon an aircraft or other vehicle. In such instances, however, the system is configured according to various embodiments, so that initiation of the analysis module 500 is deferred until receipt of at least some portion of actual load data 402 that must be verified and validated against one or more parameters in common with the expected load data 401. Of course, it may be envisioned a scenario wherein actual load data 402 may be received, for whatever reason, prior to receipt of expected load data 401 and in such circumstances, the analysis module 500 may be configured to further defer execution of its various tools (see steps 540, 550, and 560 of FIGS. 7A-B until sufficient data (401-402) has been received so as to support a meaningful comparison and analysis. Still other scenarios may be envisioned; however, it should be understood that in any of these and still other embodiments, the analysis module 500 is configured to initiate execution of its various tools upon receipt of data sufficient to support the meaningful comparison necessary to provide users of the system with accurate and efficient verification and validation results.

Turning now with particular emphasis upon step 530 of FIG. 7A, when querying whether any actual load data 402 has been received according to various embodiments, the analysis module is configured to assess a variety of data entry mechanisms via which data may be entered or received into the system 20 described herein. As a non-limiting example, data may be entered by a user via exemplary interface screen displays (not shown), which may be accessed by one or more users and/or customers of the system 20. In any of these other embodiments, the data may be received via communication with one or more additionally remote or handheld devices (e.g., receipt of real-time tracking data as ramp supervisors and/or load personnel receive and/or attend to loading one or more containers or packages upon an aircraft or other vehicle). Regardless of origin thereof, in any of these and still other embodiments, upon receipt of actual observed (e.g., real time) data in step 530, the analysis module is configured to proceed to step 540, wherein a verification tool 510 (see also FIG. 5) is executed.

Otherwise, if no actual load data 402 is received in step 530, the analysis module 500 proceeds to step 535, entering a static loop of sorts until new data is ultimately received and identified in step 530. During step 535, the analysis module 500 may be configured to passively stand by for receipt of new data. In certain embodiments, the module may, in step 535, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

During step 540 as illustrated in FIG. 7A, the analysis module 500 is configured to according to various embodiments execute a verification tool 510 to determine the weight of one or more containers or packages of interest. As previously detailed herein, the verification tool 510 may be executed via a mobile or remote device, as may be operated by one or more ramp supervisors, as a non-limiting example, upon receipt of the containers or packages of interest and prior to the initiation of loading thereof onto a vehicle or aircraft. Returning to the previously detailed non-limiting example, the ramp supervisor may obtain the actual weight of the container or package by scanning an indication thereof, as may be placed upon the package or container by a transport carrier thereof. As another non-limiting example, the actual weight may be obtained by the ramp supervisor via a remote device of the system that is operatively associated with a weight scale across which the containers or packages must pass during receipt of the same. A variety of alternative configurations may, of course, be envisioned, provided it is understood that according to various embodiments, the weight data is compared in step 540 against corresponding weight data, as is located within the expected load data 401, for the corresponding container or package. As a non-limiting example, the verification tool 510 may be configured according to certain embodiments to retrieve at least a portion of the expected load data 401 corresponding to the container or package for which actual load data 402 has been received. In certain embodiments, the corresponding data is retrieved by determination of a container or package ULD number, which may be used to reference the container or package by the system and as may be retrieved via a barcode scan thereof or otherwise.

In any of these and still other embodiments, during step 540, execution of the verification tool 510 comprises a determination, via comparison or otherwise as may be desirable, of whether one or more discrepancies exist between the weight parameters within the actual and expected load data 401, 402. In certain embodiments, as reflected via at least step 542, the verification tool 510 may be configured to further retrieve at least a portion of the expected load data 401 (e.g., the expected weight data), as necessary to perform the required determination and analysis of the received actual load data 402. The determination is evidenced in certain embodiments as verification data 515, which is generated via the verification tool 510 during step 545, as illustrated in FIG. 7A. In certain embodiments, the verification data 515 comprises an indication of whether verification of the container or package weight was successful. In other embodiments, the verification data 515 comprises additionally and/or alternatively an indication of whether one or more discrepancies were identified. It should be understood further that although container and package weight has been described herein as an initial parameter of interest prior to initiation of loading and positioning of the containers and packages, still further parameters may also be assessed via the verification tool 510 during step 540, as may be desirable or advantageous for various applications.

Turning now to step 546 of FIG. 7A, upon generation of verification data 515 in step 545, the analysis module 500 according to various embodiments is configured to query whether any discrepancies were identified by the verification tool 510, as evidenced within the verification data. In certain embodiments, discrepancies may be identified as any difference that results in anything other than a direct match between the actual and expected parameter values. In other embodiments, discrepancies may be identified based at least in part upon one or more thresholds or tolerance values, as may be pre-established by one or more users of the system 20 described herein.

Remaining with FIG. 7A, if one or more discrepancies are identified in step 546 and within the generated verification data 515 on the basis of execution of the verification tool 510 of the analysis module 500, the module is configured to proceed to step 547, wherein at least a portion of the verification data is transmitted to the mitigation module 700, at least in those embodiments comprising a mitigation module, for handling thereof, as described in further detail below in the context of the mitigation module. In those embodiments, as also described in further detail below, the analysis module 500 may be configured in step 547 to stand by for receipt of further communication from the mitigation module 700 prior to proceeding further, upon receipt of which the analysis module is configured to re-execute the verification tool 510. In this manner, it should be understood that the combination of steps 540, 545, 546, and 547 may, in certain embodiments, form an iterative loop that is repeated until a successful verification is achieved, whether via identification of no discrepancies or by authorization (or completion) of mitigation actions via the mitigation module 700, as detailed elsewhere herein. In any of these and still other embodiments, it should be understood that only once discrepancies are not identified, mitigated, or otherwise authorized as acceptable, the analysis module 500 does not proceed to step 548 and beyond, as illustrated in FIG. 7A.

Returning momentarily to step 547, according to various embodiments, whether including a mitigation module 700 or not, the analysis module may be configured to transmit the generated verification data 515 to the report module 600. In certain embodiments, such transmission may occur automatically, while in other embodiments, such may be periodic in nature, as may be desirable or pre-established by one or more users of the system. Upon transmission, it should be understood that at least a portion of the verification data 515 may be used by the report module 600 to generate one or more reports and/or alerts, for example, to notify one or more of the users of the system of the identification of a discrepancy, the details of which are described elsewhere herein in the context of the report module itself.

With reference now to step 548 of FIG. 7A, according to various embodiments, upon successful verification of the weight (or other parameters) of the containers or packages by the ramp supervisor (or other users), the analysis module 500 is configured to transmit an indication of the same, whether of a lack of identified discrepancies, of a mitigation of previously identified discrepancies, or otherwise, to one or more of the validation tool 520 and/or the report tool 610. As mentioned previously, in certain embodiments, automatic and/or real-time or near real-time notification to users of the system of dispositive actions of the system (e.g., identification of discrepancies or as in the present non-limiting example—indication of a successful verification) may be desirable, in which case the analysis module may be configured to periodically and/or automatically provide data to the report module, so as to facilitate and improved user visibility during use of the system 20.

As noted in step 548, according to various embodiments, upon successful verification, the verification data 515 may be transmitted to the validation tool 520, upon which the analysis module 500 proceeds to step 550 for execution of the validation tool 520. During step 550, as illustrated in FIG. 7A, the analysis module 500 is configured to according to various embodiments execute a validation tool 520 to determine the positioning of one or more containers or packages of interest. As previously detailed herein, the validation tool 520 may be executed via a mobile or remote device, as may be operated by one or more loading personnel, as a non-limiting example, upon loading of the containers or packages of interest onto a vehicle or aircraft. Returning to the previously detailed non-limiting example, the loading personnel may obtain the actual load position of the container or package by scanning an indication thereof, as may be obtained directly from the container or package itself, or by scanning a position indicator adjacent the container or package that is located on the aircraft itself. This may be done in a flexible and real-time fashion, so as to enable the loading personnel to move with ease about the aircraft during the loading process and via the real-time or near real-time position-based readings, have improved visibility of the accuracy and efficiency of the ongoing loading activities. A variety of alternative configurations may, of course, be envisioned for obtaining the necessary position data, provided it is understood that according to various embodiments, the observed position data is compared in step 550 against corresponding expected position data, as is located within the expected load data 401, for the corresponding container or package. As a non-limiting example, the validation tool 520 may be configured according to certain embodiments to retrieve at least a portion of the expected load data 401 corresponding to the container or package for which actual load data 402 has been received, so as to have that data available for the necessary calculations, comparisons, and the like. In certain embodiments, the corresponding data is retrieved by determination of a container or package ULD number, which may be used to reference the container or package by the system and as may be retrieved via a barcode scan thereof or otherwise.

In any of these and still other embodiments, during step 550, execution of the validation tool 520 comprises a determination, via comparison, algorithm, or otherwise as may be desirable, of whether one or more discrepancies exist between the load to position parameters within the actual and expected load data 401, 402. In certain embodiments, the comparison may be of the actual center of gravity of the container against the expected center of gravity location; however, in other embodiments, the comparison is limited to a comparison of the physical location of the container, as-is versus as-expected. In these and other embodiments, however, as reflected via at least step 552, the validation tool 520 may be configured to further retrieve at least a portion of the expected load data 401 (e.g., the expected position data), as necessary to perform the required determination and analysis of the received actual load data 402. The determination is evidenced in certain embodiments as validation data 525, which is generated via the validation tool 520 during step 555, as illustrated in FIG. 7A. In certain embodiments, the validation data 525 comprises an indication of whether verification of the container or package position (e.g., load to position) was successful. In other embodiments, the validation data 525 comprises additionally and/or alternatively an indication of whether one or more discrepancies were identified between the expected and actual position.

Turning now to step 556 of FIG. 7A, upon generation of validation data 525 in step 555, the analysis module 500 according to various embodiments is configured to query whether any discrepancies were identified by the validation tool 520, as evidenced within the validation data. In certain embodiments, discrepancies may be identified as any difference that results in anything other than a direct match between the actual and expected parameter values (e.g., position of the container, upon loading). In other embodiments, discrepancies may be identified based at least in part upon one or more thresholds or tolerance values, as may be pre-established by one or more users of the system 20 described herein. For example, a particular aircraft may have a center of gravity tolerance for the entirety of the load, such that positions for each container carried thereon may be acceptable provided such are within individual tolerances calculated by the system (or by a third party, separate and stand-alone system) capable of remaining within the consolidated tolerances of the aircraft load in its entirety. In certain embodiments, the tolerances may be defined fluidly, updating dynamically during ongoing loading of the containers or packages so as to account for prior discrepancies during the analysis of present, real-time discrepancies. A variety of alternatives may be envisioned, provided that with each, the discrepancies are calculated by the validation tool 520 in the manner described herein.

Remaining with FIG. 7A, if one or more discrepancies are identified in step 556 and within the generated validation data 525 on the basis of execution of the validation tool 520 of the analysis module 500, the module is configured to proceed to step 557, wherein at least a portion of the validation data is transmitted to the mitigation module 700, at least in those embodiments comprising a mitigation module, for handling thereof, as described in further detail below in the context of the mitigation module. It should be understood generally, however, that the analysis module 500 is configured to communicate with the mitigation module 700 in the interest of alleviating or otherwise eliminating the observed and/or identified discrepancy. In those embodiments, as also described in further detail below, the analysis module 500 may be configured in step 557 to stand by for receipt of further communication from the mitigation module 700 prior to proceeding further, upon receipt of which the analysis module is configured to re-execute the validation tool 520. In this manner, it should be understood that the combination of steps 550, 555, 556, and 557 may, in certain embodiments, form an iterative loop that is repeated until a successful validation is achieved, whether via identification of no discrepancies or by authorization (or completion) of mitigation actions (e.g., such as reloading, adjustment of position, or unloading and revising load plan activities, and the like) via the mitigation module 700, as detailed elsewhere herein. In any of these and still other embodiments, it should be understood that only once discrepancies are not identified, mitigated, or otherwise authorized as acceptable, the analysis module 500 does not proceed to step 558 and beyond, as illustrated in FIG. 7A.

Returning momentarily to step 557, according to various embodiments, whether including a mitigation module 700 or not, the analysis module may be configured to transmit the generated validation data 525 to the report module 600. In certain embodiments, such transmission may occur automatically, while in other embodiments, such may be periodic in nature, as may be desirable or pre-established by one or more users of the system. Upon transmission, it should be understood that at least a portion of the validation data 525 may be used by the report module 600 to generate one or more reports and/or alerts, for example, to notify one or more of the users of the system of the identification of a discrepancy, the details of which are described elsewhere herein in the context of the report module itself.

With reference now to step 558 of FIG. 7A, according to various embodiments, upon successful validation of the load position (or other parameters, such as center of gravity) of the containers or packages by the load personnel (or other users), the analysis module 500 is configured to transmit an indication of the same, whether of a lack of identified discrepancies, of a mitigation of previously identified discrepancies, or otherwise, to one or more of the comparison tool 505 and/or the report tool 610. As mentioned previously, in certain embodiments, automatic and/or real-time or near real-time notification to users of the system of dispositive actions of the system (e.g., identification of discrepancies or as in the present non-limiting example—indication of a successful verification) may be desirable, in which case the analysis module may be configured to periodically and/or automatically provide data to the report module, so as to facilitate and improved user visibility during use of the system 20.

As noted in step 558, according to various embodiments, upon successful validation, the validation data 525 may be transmitted to the confirmation tool 505, upon which the analysis module 500 proceeds (via step 559 visible in both FIGS. 7A-B) to step 560 (see only FIG. 7B) for execution of the confirmation tool 505. During step 560, as illustrated in FIG. 7B, the analysis module 500 is configured to according to various embodiments execute a confirmation tool 505 to electronically perform a final load manifest accuracy check (LMAC), which task was previously performed manually, for example, via a paper-based side-by-side comparison of expected versus actual/observed data. As previously detailed herein, the confirmation tool 505 may be executed via a mobile or remote device, as may be operated by one or more ramp supervisors, as a non-limiting example, upon receipt of a load complete notification from one or more other users of the system (e.g., one or more load personnel). A variety of alternative configurations may, of course, be envisioned for performing a final confirmation of the accuracy and completeness of observed/recorded data, provided it is understood that according to various embodiments, such is compared against at least portions of the expected load data 401 and/or manifest data 403, as may be contained within and retrieved from the data module 400. As a non-limiting example, the confirmation tool 505 may be configured according to certain embodiments to retrieve at least a portion of the manifest data 403 corresponding to the containers and/or packages for which loading has been completed. The retrieved data, which may, in certain embodiments, be formatted in a draft manifest format, such that actual/observed data was initially (e.g., previously) unpopulated, may thus be updated via execution of the confirmation tool 505 to include that actual/observed data. In these and other embodiments, the data may be highlighted (e.g., color-coded or otherwise) so as to bring to the viewer's attention any discrepancies or mitigation actions, as may have been identified or undertaken during the course of the loading process. Various configurations may be envisioned in this regard, with such updated data being presented in steps 565 and 566, as illustrated in FIG. 7B.

In any of these and still other embodiments, during step 560, execution of the confirmation tool 505 comprises a determination, via comparison, algorithm, or otherwise as may be desirable, of whether one or more discrepancies exist between any portion of the expected load data and the actual/observed load data. In these and other embodiments, however, as mentioned and as reflected via at least step 562, the confirmation tool 505 may be configured to further retrieve at least a portion of manifest data 403 and/or the expected load data 401, as necessary to perform the required determination and analysis of the received actual load data 402. The determination is evidenced in certain embodiments as confirmation data 504, which is generated via the confirmation tool 505 during step 565, as illustrated in FIG. 7B. In certain embodiments, the confirmation data 504 comprises an indication of whether verification of the container or package loading was successful. In other embodiments, the confirmation data 504 comprises additionally and/or alternatively an indication of whether one or more discrepancies were identified between the expected and actual load data.

Turning now to step 566 of FIG. 7B, upon generation of confirmation data 504 in step 565, the analysis module 500 according to various embodiments is configured to query whether any discrepancies were identified by the confirmation tool 505, as evidenced within the confirmation data. In certain embodiments, discrepancies may be identified as any difference that results in anything other than a direct match between the actual and expected parameter values (e.g., position of the container, upon loading and the like). In other embodiments, discrepancies may be identified based at least in part upon one or more thresholds or tolerance values, as may be pre-established by one or more users of the system 20 described herein. In certain embodiments, the tolerances may be defined fluidly, updating dynamically during ongoing loading of the containers or packages so as to account for prior discrepancies during the analysis of present, real-time discrepancies. A variety of alternatives may be envisioned, provided that with each, the discrepancies are calculated by the confirmation tool 505 in the manner described herein.

Remaining with FIG. 7B, if one or more discrepancies are identified in step 566 and within the generated confirmation data 504 on the basis of execution of the confirmation tool 505 of the analysis module 500, the module is configured to proceed to step 567, wherein at least a portion of the confirmation data is transmitted to the mitigation module 700, at least in those embodiments comprising a mitigation module, for handling thereof, as described in further detail below in the context of the mitigation module. It should be understood generally, however, that the analysis module 500 is configured to communicate with the mitigation module 700 in the interest of alleviating or otherwise eliminating the observed and/or identified discrepancy. In those embodiments, as also described in further detail below, the analysis module 500 may be configured in step 567 to stand by for receipt of further communication from the mitigation module 700 prior to proceeding further, upon receipt of which the analysis module is configured to re-execute the confirmation tool 505. In this manner, it should be understood that the combination of steps 560, 565, 566, and 567 may, in certain embodiments, form an iterative loop that is repeated until a successful final confirmation is achieved, whether via identification of no discrepancies or by authorization (or completion) of mitigation actions (e.g., such as reloading, adjustment of position, or unloading and revising load plan activities, and the like) via the mitigation module 700, as detailed elsewhere herein. In any of these and still other embodiments, it should be understood that only once discrepancies are not identified, mitigated, or otherwise authorized as acceptable, the analysis module 500 does not proceed to step 570 and beyond, as illustrated in FIG. 7B.

Returning momentarily to step 567, according to various embodiments, whether including a mitigation module 700 or not, the analysis module may be configured to transmit the generated confirmation data 504 to the report module 600. In certain embodiments, such transmission may occur automatically, while in other embodiments, such may be periodic in nature, as may be desirable or pre-established by one or more users of the system. Upon transmission, it should be understood that at least a portion of the confirmation data 504 may be used by the report module 600 to generate one or more reports and/or alerts, for example, to notify one or more of the users of the system of the identification of a discrepancy, the details of which are described elsewhere herein in the context of the report module itself.

With reference now to step 570 of FIG. 7B, according to various embodiments, upon successful validation of the load data of the containers or packages by the ramp supervisor and/or additional users of the system (e.g., load personnel), the analysis module 500 is configured to generate a finalized manifest 503, which provides documentation necessary to authorize departure of the vehicle or aircraft upon which the containers and packages have been loaded. Generally speaking, the finalized manifest 503 includes a complete package of data, displaying actual/observed load data (alone or as compared against expected data, however as may be desirable), upon confirmation of the same and completion of loading and locking of the containers and packages in place. As indicated by step 575, such finalized manifest, or in certain embodiments, an indication or notification of the existence thereof is transmitted to at least the report module 600, which in turn, via the report tool 610, generates one or more reports or notifications concerning the same, which are transmitted to one or more users of the system. As a non-limiting example, the finalized manifest, as authorized and confirmed for accuracy and completeness may be forwarded via the system in a near real-time fashion and electronically to the flight crew, providing them with documentation necessary to proceed with departure protocols for the aircraft. Of course, a variety of alternative embodiments and configurations may be envisioned, as should be considered within the scope of the present invention described herein.

Report Module 600

With reference to FIG. 8, according to various embodiments, the report module 600 is configured to generate one or more reports 612 and/or alerts 614 to one or more users of the system 20 (or other parties, such as third party entities or programs configured to provide pre-determined calculations of center of gravity computations for particular aircrafts based upon particular containers or packages or otherwise), as may be desirable according to particular applications. In certain embodiments, the reports 612 and/or alerts 614 are based at least in part upon the generated verification data 515, validation data 525, and/or confirmation data 504 (or even the finalized manifest 503), as have been previously described herein, although in other embodiments other data may be additionally or alternatively incorporated therewith (e.g., mitigation data 715). It should be understood, however, that according to various embodiments the report module 600 is configured so as to facilitate users of the system 20 obtaining real-time or near real-time data from which they can assess and/or revise container load to position decisions, so as to most efficiently and effectively maximize the loading process and avoid, substantially minimize, or eliminate cost and time-intensive unloading and reloading procedures oftentimes necessary with conventional manual side-by-side validation checks.

Returning to the previously described non-limiting example, where a discrepancy has been identified with the actual weight of a container or package, relative to a received expected weight of the container or package, the latter upon which the center of gravity and load to position calculations were based, an identification of such discrepancy may trigger generation of one or more reports 612 and/or alerts 614 to at least the ramp supervisor, providing notice thereof so that further loading activities may be paused or otherwise reorganized pending resolution of the discrepancy. The alert 614 may be transmitted to the ramp supervisor via the system, for display upon the remote or mobile device used by the ramp supervisor for implementation of the loading process via the system 20 described herein. In certain embodiments, alerts 614 may be further transmitted to loader personnel and/or external third party entities, as may be desirable for further visibility and awareness of status and/or for notification of potential mitigation and/or recalculation of various parameters, including, for example, centers of gravity for specific discrepancy-containing parcels or packages, without which the accuracy of the center of gravity of the entirety of the aircraft, upon loading thereof, may be skewed. Various configurations and alternatives therefor may be envisioned.

With focus again on FIG. 8, in any of these and still other various embodiments, if "newly received" data is identified in step 620, the report module 600 proceeds to step 630; otherwise the module proceeds into a static loop via step 625, pending receipt of new data. During step 625, the report module 600 may be configured to passively stand by for receipt of data. In certain embodiments, the report module

600 may, in step 625, periodically (e.g., every 5 seconds, or at any desirable interval) proactively ping one or more databases contained within the data module 400 and/or the analysis module 500, as may be desirable. In certain embodiments, the report module 600 may ping or otherwise be in periodic or continuous communication with the mitigation module 700 as well. Of course, various alternative data monitoring configurations may be envisioned, without departing the scope and nature of the present invention, as such are commonly known and understood in the art.

During step 630, the report module 600 is configured to run a report tool 610, which is generally configured to generate, in step 650, one or more reports 612 and/or alerts 614 based at least in part upon the verification data 515 and/or the validation data 525 and/or the confirmation data 505, and/or the mitigation instructions 715. For example, if a discrepancy is identified by any of the tools generating such data (as detailed previously herein), receipt of such data and indication triggers, in certain embodiments, the report tool 610 generation and/or transmission (see steps 650 and 660) of a notification thereof to one or more users of the system, for example, the ramp supervisor. In certain embodiments, the reports 612, notifications and alerts 614 may be configured such that further activity is suspended pending acknowledgement or otherwise handling/processing of the alert in a manner so as to eliminate the discrepancy.

According to various embodiments, alerts 614 may be generated primarily for purposes of notification upon identification of one or more discrepancies. In certain embodiments, thus reports 612 may be generated primarily upon successful verifications, validations, and/or confirmations, in other words where no discrepancies have been identified. Of course, in still other embodiments, the alert(s) 614 may be generated concurrently with the reports 612 depending upon user preferences or other pre-established parameters, as may be desirable. The timing and distinctions between the delivery and transmission of the reports versus (and/or) alerts may be based upon any of a variety of preferences, even regulatory requirements, and/or common carrier preferences or requirements, as may be applicable in various contexts.

It should also be understood, returning to FIG. 8, that according to various embodiments, during step 660, any combination of the reports 612 and/or alerts 614 that may have been generated, as may be influenced by previously defined parameters, whether by third parties or other users of the system 20, may be further transmitted (via one or more networks or otherwise) to one or more additional users or associated entities of the system. For example, upon generation of an alert 614 of a potential discrepancy, an indication thereof may be transmitted to at least the common carrier for notification thereof so that mitigation actions and the like may be taken so as to seek to avoid actual occurrence of the violation. For example, the common carrier may be able to rectify the weight of the package such that the discrepancy no longer exists. Various scenarios may be envisioned, further including the non-limiting examples of: notification of a deviation of two inches in positioning of a container or package resulting in a variation relative to expected positioning, report of a clean (e.g., successfully verified, validated, and confirmed) loading to flight crew to authorize departure, a finalized manifest report to the flight crew and/or regulatory entities (e.g., the Federal Aviation Association) so as to evidence compliance, and the like.

Noting further FIG. 8, it should be emphasized that in those embodiments incorporating a mitigation module 700, the report module 700 may be further configured in steps 650 and 660 to generate and transmit one or more instructions 715, as may have been generated by the mitigation tool 710 to facilitate implementation of mitigation actions to eliminate or otherwise address any identified discrepancies. Such instructions 715 may be transmitted separately from reports and/or alerts, as configured in the sense described previously herein according to various embodiments. In other embodiments, the instructions 715 may be transmitted within (e.g., as embedded portions of) otherwise generated reports and/or alerts. In certain embodiments, the reports and/or alerts containing instructions 715 may require user authorization or approval of further action; however, in other embodiments, the reports and instructions may be simply informative of mitigating actions being commenced, as may be determined at least in part by pre-established user preferences and parameters for determination of and implementation of mitigating actions, as will be described in further detail below.

It should be understood that while the alerts 614 and reports 612 described herein may be transmitted periodically and with differing timetables respective to one another, the basis of both generating and transmitting the same may also further differ. For example, alerts may be reserved for actions for which user (or third party entity) approval is necessary for further action, for example, where approval is necessary to implement mitigation actions, whether due to the cost incurred thereby or for alternative reasons. Reports may be simply informative, requiring no further positive action or interaction from the recipient thereof with the system 20. In such embodiments, reports, both with respect to content and the frequency thereof, may be established and even pre-established by any of the variety of users of the system, including non-users of the system to which notification or reporting may be mandated by various regulations or user preferences. The formatting of such reports and/or alerts may also be customized, as may be desired for particular users of the system. Indeed, additional and/or alternative formats of reporting and/or communication may be envisioned without departing from the scope and intent of the present invention, and any of those, like those described previously herein, may be implemented in a manual or automatic fashion, electronically or otherwise, however as may be desirable.

Mitigation Module 700

As previously described, the mitigation module 700 is configured to, upon receipt of various components of data, such as non-limiting examples of verification data 515, and/or validation data 525 and/or confirmation data 505, execute a mitigation tool 710.

FIG. 9 illustrates steps that may be executed by the mitigation module 700 according to various embodiments. Beginning with step 720, the mitigation module 700 assesses whether any data has been received by the module. In certain embodiments, the mitigation module 700 makes this assessment by periodically scanning one or more databases (see FIG. 4) associated with the module and by identifying some portion of data within one or more of the databases that was not present during a previous periodic scan under step 720. Of course, alternative configurations may be envisioned, wherein, as a non-limiting example, the mitigation module 700 may actively receive data (e.g., as input by a user of the system 20 via an interface, whether web-based or otherwise and/or directly from the analysis module 500 or the data module 400) and upon receipt thereof, execute step 730.

With continued reference to FIG. 9, in any of these and still other various embodiments, if "newly received" data is identified, the mitigation module 700 proceeds to step 730; otherwise the module proceeds into a static loop via step 725. During step 725, the mitigation module 700 may be configured to passively stand by for receipt of new data. In certain embodiments, the module may, in step 725, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

During step 730, the mitigation module 700 is configured to according to various embodiments execute a mitigation tool 710 to determine whether mitigation actions are warranted, appropriate, or even desired, and if so, to facilitate and/or initiate implementation thereof. In at least the illustrated embodiment, execution of the mitigation tool 710 in step 730 results at least in part in the generation of one or more instruction(s) 715 in step 740, which instructions are configured to facilitate implementation of the mitigation actions. In certain embodiments, the mitigation tool 710 may be still further configured to confirm completion of a particularly determined and initiated mitigation action. Non-limiting examples of mitigation actions include recalculation of a container or package's weight upon initial identification of a discrepancy between the expected and observed weight (as may be recorded via the system 20 by the ramp supervisor); adjustment of load-to-position data upon identification of a discrepancy between the expected and observed positions, upon loading (as may be recorded via the system by load personnel; recalculation of expected load-to-position data upon verification of a weight discrepancy; and/or delaying further loading until rectification occurs of the weight or positioning discrepancy. Any number of a variety of possible actions may be envisioned, as within the scope of mitigation potential and occurring violations, and such should all be considered within the scope of the various embodiments described herein, provided such at least in some fashion enable efforts to mitigate actual occurrence of a violation/discrepancy or mitigate further activity that could exacerbate the discrepancy (e.g. continued loading of the aircraft that could result in cost, time intensive unloading and reloading activities).

According to various embodiments, the mitigation tool 710 may be configured to determine the appropriate mitigation action based upon retrieval (see step 735) of various portions of mitigation data 404, which may include as non-limiting examples previously executed mitigation actions that may be presently considered and/or pre-established mitigation actions, as may have been created by one or more users of the system 20 described herein. It should be understood that any of a variety of mitigation actions may be identified via execution of the mitigation tool 710, whether based at least in part upon pre-established parameters, pre-approved actions, a real-time assessment of various parameters to identify optimal actions, or the like. It should also be understood that, as will be detailed further below, the action identified may be automatically initiated (or the system may facilitate the same) where appropriate (e.g., where a user has authorized previously automatic implementation of mitigation actions). Of course, in other embodiments, further user approval may be necessary prior to initiation of identified mitigation actions. Still further, in these and still other embodiments, two or more options for mitigation actions may be determined and both or all provided to one or more users of the system for consideration thereof. In these embodiments, the mitigation module may be configured to await receipt of a user selection of a desired or preferred mitigation action prior to proceeding further.

According to various embodiments, with continued reference to FIG. 9, upon determination of one or more feasible and/or optimal mitigation actions via execution of the mitigation tool 710 (and/or via approval received from one or more users) in step 730, the mitigation module 700 is configured to execute step 740, in which instructions 715 are generated. The instructions 715 according to various embodiments may include at least one identified mitigation action. In certain embodiments, the instructions may include one or more directions based at least in part upon one or more users of the system and/or external entities may facilitate and initiate the desired mitigation action. In at least one embodiment, the instructions may be computer-readable code, so as to further facilitate automatic implementation of the desired mitigation action by the system or, alternatively, by or in conjunction with an external system.

With continued reference to step 740, in certain embodiments, two or more mitigation actions may be identified within the instructions, versus prior to generation thereof, as previously described in the context of step 730. In these and still other embodiments, the generated instructions 715 including the multiple actions may be transmitted to the report module (see step 750) so as to permit a user of the system to select a desired action, if any. In other embodiments, the identified mitigation action may be further implemented (or the implementation thereof is at least initiated by transmitting appropriate instructions for the same-for example the non-limiting and previously detailed option wherein the instructions comprise computer-readable code portions). In those and still other embodiments, the instructions 715 may further comprise an indication of the identified mitigation action, such that one or more users of the system may be further notified of initiation and implementation of the mitigation action. Indeed, it should be understood that the instructions 715 may be any of a variety of combinations of executable instructions and data that may be utilized by the report module 600 for the purpose of providing notifications to one or more users so as to improve visibility, as previously described herein.

Remaining with FIG. 9, it may be seen that in step 750 according to various embodiments, the generated instructions 715 may be transmitted to the analysis module 500 and/or the report module 600. In certain embodiments, as mentioned, transmission to the report module 600 may facilitate sufficient notification to one or more users of the system of the mitigation action or the need for selection thereof from a list or otherwise. In these and still other embodiments, it should be understood that identification, selection, and implementation of the mitigation action within the instructions 715 may be automatic, such that the mitigation data may further include instructions for (and which may be transmitted to) parties responsible for the implementation of the instructions. In step 750 it should also be understood that, as previously mention, the transmission of the instructions 715 to the report module 600 may be such that the report module may, in turn, generate one or more reports and/or alerts to either facilitate implementation of the mitigation action or to notify one or more users of the system 20 of initiated action or of a need for approval to initiate the action, however, as may be desirable in certain applications. It should be understood as well that any of a variety of configurations, whether automatic, semi-automatic, manual requiring approval, or otherwise may be envisioned, as considered within the scope and nature of the various embodiments of the system 20 described herein.

According to various embodiments, as mentioned, the generated and/or user selected instructions 715 may additionally and/or alternatively be transmitted in step 750 to the analysis module 500, as illustrated in FIG. 9. This may be done as a portion of the execution of the mitigation tool 710. Indeed, with reference momentarily to FIG. 5, it should be understood that in these and other embodiments, where mitigation action is determined via execution of the mitigation tool 710 in step 730, the tool may be configured to facilitate re-execution of one or more of the tools (510, 520, 505) so as to subsequently assess whether the identified discrepancy has been mitigated. In certain embodiments, calling of the verification, validation, or confirmation tools 510, 520, 505 of the analysis module 500 may occur only upon further indication at/by the mitigation module 700 that the desired or selected mitigation action has been completed. Such may be received via one or more users of the system or otherwise, however as may be beneficial according to various applications. In these and still other embodiments, it should be understood that communication between the mitigation tool 710 and the one or more tools of the analysis module 500 may be tailored to return communication only to that tool from which communication to the mitigation module 700 was initiated. For example, if the mitigation module was initiated by the verification tool 510 identifying a discrepancy in container or package weight, the mitigation tool 710, at a time deemed appropriate, will return communication to the verification tool alone. In this manner, the process flow of the analysis module 500 (see FIGS. 7A-B) may then re-commence per normal procedures upon a subsequently successful verification. Similarly, if the mitigation module 700 is activated by the validation tool 520, communication back to the analysis module may be restricted as to and with only the validation tool, as indicated by the various dashed arrow lines of FIG. 5. Of course, any of a variety of return-communication configurations may be envisioned, as between the analysis and mitigation modules, and such should be considered within the scope of the present invention, as may be desirable or beneficial for certain applications.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A load to position system for receiving, loading, and positioning of a plurality of containers upon a transport vehicle, said system comprising:
one or more hardware processors and computer storage media storing computer-executable instructions and components that, when executed, by the one or more hardware processors, cause the one or more hardware processors to:
receive, via a device, actual load data associated with at least one of the plurality of containers to be transported upon the transport vehicle, the actual load data comprising at least one of: a container identification number, an actual load weight, and an actual load position for the at least one of the plurality of containers;
retrieve expected load data associated with the at least one of the plurality of containers based at least in part upon at least one of: identifying the container identification number in the actual load data, the expected load data comprising at least a container information number, an expected load weight, an expected load position, or an expected load sequence for each of the plurality of containers;
in response to determining that a load weight discrepancy exists based at least in part on a comparing the actual load data with the expected load data, automatically determine a mitigating action from a plurality of mitigating actions, the mitigating action being configured to at least one of alleviate or eliminate the determined load weight discrepancy; and
automatically generate and transmit to a user interface of the device a selectable indication of the mitigating action.

2. The system of claim 1, wherein the determination of the mitigating action comprises automatically recalculating at least a mitigated expected load sequence.

3. The system of claim 1, wherein the expected load data and the actual load data are associated with aircraft load data.

4. The system of claim 1, wherein the expected load data corresponds to a threshold of pre-established parameters.

5. The system of claim 1, wherein the one or more hardware processors are further configured to transmit the selectable indication of the mitigating action to at least one user of the system upon generation thereof.

6. The system of claim 1, wherein the plurality of mitigating actions are presented for user selection, wherein a user selects the mitigating action for the alleviating or eliminating.

7. The system of claim 1, wherein the determined load weight discrepancy is configured such that anything less than an exact match between the expected load data and the actual load data comprises a discrepancy.

8. The system of claim 1, wherein the determined load weight discrepancy is configured such that any difference in excess of a pre-established threshold between the expected load data and the actual load data comprises a discrepancy.

9. The system of claim 1, wherein the expected load data is user-defined.

10. The system of claim 1, wherein the transport vehicle is at least one of a vessel or vehicle.

11. The system of claim 1, in response to determining that the load weight discrepancy exists, cause an alert to be generated, the alert being indicative of providing notice thereof so that further loading activities may be paused or otherwise reorganized pending resolution of the load weight discrepancy.

12. The system of claim 11, wherein the alert is caused to be displayed upon a remote or mobile device used by ramp or loader personnel.

13. The system of claim 1, wherein the mitigating action corresponds to alleviating the determined load weight discrepancy by at least changing the actual load data, and wherein the one or more hardware processors are further configured to determine, in response to the alleviating, whether the load weight discrepancy still exists.

14. The system of claim 13, wherein the one or more hardware processors are further configured to transmit at least one of a finalized manifest or an indication thereof to one or more users of the system indicating whether the load weight discrepancy still exits.

15. The system of claim 14, wherein one or more users of the system comprise at least a flight crew that may rely at least in part upon the finalized manifest for authorizing departure of the transport vehicle.

16. A computer-implemented method for receiving, loading, and positioning of a plurality of containers upon a transport vehicle, said method comprising:
    receiving, via a device, actual load data associated with at least one of the plurality of containers, the actual load data comprising at least one of: a container identification number, an actual load weight, and an actual load position for the at least one of the plurality of containers;
    retrieving, via at least one computer processor, at least a portion of expected load data associated with the at least one of the plurality of containers, the retrieval being based at least in part upon identifying at least one of: the corresponding container identification number in the actual load data, the expected load data comprising at least a container information number, an expected load weight, an expected load position, and an expected load sequence for each of the plurality of containers;
    in response to determining that a load weight discrepancy exists, automatically determining a mitigating action from a plurality of mitigating actions, the mitigating action being configured to at least one of alleviate or eliminate the load weight discrepancy; and
    automatically generating and transmitting, to a user interface of the device, a selectable indication of the mitigating action.

17. The computer-implemented method of claim 16, wherein the mitigating action corresponds to alleviating the determined load weight discrepancy by at least changing the actual load data, and wherein the method further comprises determining, via the at least one computer processor, in response to the alleviating, whether the load weight discrepancy still exists..

18. The computer-implemented method of claim 17, further comprising transmitting, by the at least one computer process, at least one of a finalized manifest or an indication thereof to one or more users indicating whether the load weight discrepancy still exits.

19. The computer-implemented method of claim 17, further comprising:
    conducting, in response to performing the mitigating action, a final comparison of the actual load data against the expected load data, the final comparison being configured to compare a plurality of parameters within the actual load data against a corresponding plurality of parameters within the expected load data so as to determine whether one or more accuracy discrepancies still exist;
    in response to a successful confirmation of no accuracy discrepancies, generating, via the at least one computer processor, at least one communication configured to facilitate at least one of further loading of the plurality of containers or departure of the transport vehicle; and
    in response to determining the one or more accuracy discrepancies still exist, generating, via the at least one computer processor, at least one communication indicative of an unsuccessful confirmation that is configured to prevent at least one of further loading of the plurality of containers or departure of the transport vehicle.

20. A non-transitory computer program product comprising at least one computer-readable storage medium having computer-readable program code portions embodied therein, the computer-readable program code portions comprising one or more executable portions configured for:
    receiving actual load data associated with at least one of a plurality of containers, the actual load data being received via one or more devices, the actual load data comprising at least one of: a container identification number, an actual load weight, and an actual load position for the at least one of the plurality of containers;
    retrieving at least a portion of expected load data associated with the at least one of the plurality of containers for which actual load data has been received, the retrieval being based at least in part upon identifying the corresponding container identification numbers in the actual load data or the at least a portion of the expected load data, the expected load data comprising at least one of: container identification numbers, an expected load weight, and an expected load sequence for each of the plurality of containers;
    in response to determining that a load weight discrepancy exists, automatically determining a mitigating action from a plurality of mitigating actions, the mitigating action being configured to at least one of alleviate or eliminate the weight discrepancy; and
    automatically generating and transmitting, to a user interface of each of the one or more devices, a selectable indication of the mitigating action.

* * * * *